US011060726B2

(12) United States Patent
Aoyama et al.

(10) Patent No.: US 11,060,726 B2
(45) Date of Patent: Jul. 13, 2021

(54) COMPRESSOR DIFFUSER AND GAS TURBINE

(71) Applicant: MITSUBISHI HEAVY INDUSTRIES, LTD., Tokyo (JP)

(72) Inventors: Kuniaki Aoyama, Tokyo (JP); Hiroyuki Yamamoto, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 73 days.

(21) Appl. No.: 16/095,859

(22) PCT Filed: Apr. 17, 2017

(86) PCT No.: PCT/JP2017/015431
§ 371 (c)(1),
(2) Date: Oct. 23, 2018

(87) PCT Pub. No.: WO2017/188039
PCT Pub. Date: Nov. 2, 2017

(65) Prior Publication Data
US 2019/0170353 A1    Jun. 6, 2019

(30) Foreign Application Priority Data

Apr. 25, 2016    (JP) .............................. JP2016-086799

(51) Int. Cl.
*F23R 3/10*    (2006.01)
*F01D 9/02*    (2006.01)
(Continued)

(52) U.S. Cl.
CPC .................. *F23R 3/10* (2013.01); *F01D 9/02* (2013.01); *F02C 7/04* (2013.01); *F02C 7/20* (2013.01); *F23R 3/04* (2013.01); *F23R 3/46* (2013.01)

(58) Field of Classification Search
CPC ........ F01D 9/02; F04D 29/541; F04D 29/542; F04D 29/545; F04D 29/547; F23R 3/02;
(Continued)

(56) References Cited

U.S. PATENT DOCUMENTS 2,493,641 A    1/1950    Putz
2,609,663 A    9/1952    Newcomb
(Continued)

FOREIGN PATENT DOCUMENTS

CN    101839256    9/2010
DE    600 31 744    2/2007
(Continued)

OTHER PUBLICATIONS

International Search Report dated May 23, 2017 in International (PCT) Application No. PCT/JP2017/015431.
(Continued)

*Primary Examiner* — Scott J Walthour
(74) *Attorney, Agent, or Firm* — Wenderoth, Lind & Ponack, L.L.P.

(57) ABSTRACT

A compressor diffuser is disposed between cylindrical combustion chambers that are disposed around a rotational shaft to supply combustion gas to a turbine and a compressor that is rotatable about the rotational shaft to generate compressed air. The compressor diffuser includes one end connected to an outlet of the compressor; and another end connected to an air inlet of one of the combustion chambers. The one end defines an opening and has double arc portions curving about the rotational shaft, and the other end defines an opening shaped in conformance with the cylindrical shape of the one of the combustion chambers. The compressor diffuser is disposed continuously along an extending direction of the rotational shaft from the one end to the other end.

17 Claims, 15 Drawing Sheets

(51) Int. Cl.
*F23R 3/46* (2006.01)
*F02C 7/04* (2006.01)
*F23R 3/04* (2006.01)
*F02C 7/20* (2006.01)

(58) Field of Classification Search
CPC .... F23R 3/04; F23R 3/045; F23R 3/10; F23R 3/16; F23R 3/26; F23R 3/46
See application file for complete search history.

(56) References Cited

U.S. PATENT DOCUMENTS

| | | | |
|---|---|---|---|
| 3,119,234 A | 1/1964 | Murray et al. | |
| 3,303,644 A | 2/1967 | Moxon et al. | |
| 4,180,972 A | 1/1980 | Herman et al. | |
| 4,458,479 A * | 7/1984 | Reider | F23R 3/02 60/751 |
| 6,334,297 B1 | 1/2002 | Dailey et al. | |
| 2007/0272220 A1 | 11/2007 | Rozim | |
| 2011/0271654 A1 * | 11/2011 | Siden | F01D 9/02 60/39.37 |
| 2013/0224007 A1 * | 8/2013 | Rodriguez | F01D 9/041 415/208.1 |
| 2013/0224009 A1 * | 8/2013 | Little | F02C 3/14 415/208.1 |

FOREIGN PATENT DOCUMENTS

| | | |
|---|---|---|
| GB | 842677 | 7/1960 |
| JP | 2014-185539 | 10/2014 |

OTHER PUBLICATIONS

Office Action dated Jun. 22, 2020 in Chinese Application No. 201780025010.2 with English translation.
Office Action dated Oct. 27, 2020 in German Patent Application No. 112017002151.0, with English-language translation.

\* cited by examiner

COMPRESSOR DIFFUSER AND GAS TURBINE

FIELD

The present invention relates to a compressor diffuser and a gas turbine.

BACKGROUND

Typical gas turbines include a compressor that generates compressed air, a combustor that generates combustion gas using the compressed air generated by the compressor, and a turbine that is rotatably driven by the combustion gas generated by the combustor. In such gas turbines, the compressed air from the compressor is supplied through a combustor casing chamber formed around a rotational shaft to a plurality of combustion chambers of the combustor disposed around the rotational shaft. In addition, gas turbines typically include diffusers (compressor diffusers) at the outlet of the compressor to convert dynamic pressure of the compressed air into static pressure. Each diffuser has a divergent duct shape with a gradually increasing cross-sectional area toward the combustor casing chamber, so that the diffuser converts dynamic pressure of the compressed air flowing toward the combustor casing chamber into static pressure (see Japanese Patent Application Laid-open No. 2014-185539 (JP '539), for example).

In the gas turbine disclosed in JP '539, the compressed air generated by the compressor flows through the diffusers into the combustor casing chamber toward the turbine along the rotational shaft. In the combustor casing chamber, the compressed air reverses toward the compressor and then reverses again at the combustor inlet to flow into the combustion chambers. The compressed air reverses several times in the combustor casing chamber before entering the combustion chambers, which causes a large pressure loss. In the gas turbine disclosed in JP '539, the compressed air generated by the compressor expands suddenly upon entering the combustor casing chamber, thereby causing a large pressure loss. Such a large pressure loss mainly causes a reduction in efficiency in rotationally driving the turbine and cooling efficiency of the compressed air, which in turn reduces the overall efficiency of the gas turbine.

The present invention has been made to solve the problems above and it is an object of the present invention to provide a compressor diffuser and a gas turbine that can reduce pressure loss in the compressed air supplied from the compressor to the combustion chambers.

SUMMARY OF THE INVENTION

To achieve the object described above, a compressor diffuser according to an aspect of the present invention is disposed between cylindrical combustion chambers that disposed around a rotational shaft to supply combustion gas to a turbine and a compressor that is rotatable about the rotational shaft to generate compressed air. The compressor diffuser includes one end connected to an outlet of the compressor; and another end connected to an air inlet of one of the combustion chambers, the one end defining an opening and having double arc portions curving about the rotational shaft, the other end defining an opening shaped in conformance with the cylindrical shape of the one of the combustion chambers. The compressor diffuser is disposed continuously along an extending direction of the rotational shaft from the one end to the other end.

The compressor diffuser directly supplies compressed air generated by the compressor to the corresponding combustion chamber in the combustor. Compared to a structure that supplies compressed air generated by the compressor to the combustor casing chamber, such a direct supply of the compressed air prevents reverse flow of the compressed air and also prevents sudden expansion of the compressed air, thereby reducing pressure loss in the compressed air. As a result, pressure loss in the compressed air supplied from the compressor to the combustion chamber can be reduced.

Furthermore, it is preferable that the compressor diffuser according to an aspect of the present invention includes an inner member with which the one end has a single-annular outline and the other end has a double-annular outline.

Since the compressor diffuser includes the inner member with which the one end has a single-annular outline and the other end has a double-annular outline, the compressor diffuser forms an annular current of compressed air in conformance with the cylindrical shape of the combustion chamber and supplies it to the combustion chamber. This structure adjusts supply distribution of compressed air to the combustion chamber. As a result, combustion efficiency of the combustion chamber can be increased.

Furthermore, it is preferable that the compressor diffuser according to an aspect of the present invention includes a separating member that divides a path into two paths that are continuous from the one end to the other end.

The compressor diffuser includes the separating member to divide an airflow path into two paths that are continuous from the one end to the other end. Compared to a structure not dividing the airflow path, this structure reduces expansion angles of air in each airflow path, thereby reducing pressure loss.

Furthermore, it is preferable that the compressor diffuser according to an aspect of the present invention includes an air bleed port disposed at at least one of the one end and the other end to bleed the compressed air.

If the air bleed port is disposed at the one end, low-velocity compressed air is bled, since the compressed air at the perimeter of the one end in the compressor diffuser has a lower velocity distribution. Bleeding the lower velocity compressed air leads to a reduction in pressure loss. If the air bleed port is disposed at the other end, higher-pressure compressed air is bled, which can cool high-pressure components.

Furthermore, in the compressor diffuser according to an aspect of the present invention, it is preferable that the compressor diffuser accommodates a vane inside the one end, the vane being disposed at the outlet of the compressor, the compressor diffuser having side walls, which are close to the one end, in a turbine radial direction to divide a flow path in a turbine circumferential direction, the portions being shaped in conformance with a shape of the vane.

With this configuration, the compressor diffuser can prevent turbulence of the compressed air flowing along the side walls, thereby reducing pressure loss in the compressed air.

Furthermore, in the compressor diffuser according to an aspect of the present invention, it is preferable that the one end has side portions each corresponding to a rear end of a vane disposed at the outlet of the compressor.

With this configuration, the compressor diffuser can prevent turbulence of the compressed air flowing from the side portions to the other end, thereby reducing pressure loss in the compressed air.

Furthermore, in the compressor diffuser according to an aspect of the present invention, it is preferable that the other end is inserted in the combustion chamber and the one end is mounted to the outlet of the compressor via a mounting flange.

With this configuration, the compressor diffuser can be secured by inserting the other end in the combustion chamber and mounting the mounting flange to the outlet of the compressor.

Furthermore, in the compressor diffuser according to an aspect of the present invention, it is preferable that the other end is integrally formed with the combustion chamber, and the one end is mounted to the outlet of the compressor via a mounting flange.

Since the other end is integrally formed with the combustion chamber, the compressor diffuser can be secured together with the combustion chamber by mounting the mounting flange to the outlet of the compressor.

Furthermore, in the compressor diffuser according to an aspect of the present invention, it is preferable that the compressor diffuser is mounted via a supporting member in a combustor casing chamber in which the combustion chamber is disposed with the other end being inserted in the combustion chamber and the one end abutting the outlet of the compressor.

With this configuration, the compressor diffuser can be secured in the combustor casing chamber via the supporting member with the other end inserted in the combustion chamber and the one end abutting the outlet of the compressor.

Furthermore, in the compressor diffuser according to an aspect of the present invention, it is preferable that the compressor diffuser is mounted via a supporting member in a combustor casing chamber in which the combustion chamber is disposed with the other end being integrally formed with the combustion chamber and the one end abutting the outlet of the compressor.

Since the other end is integrally formed with the combustion chamber, the compressor diffuser can be secured in the combustor casing chamber via the supporting member with the one end abutting the outlet of the compressor.

To achieve the object described above, a gas turbine according to an aspect of the present invention includes a turbine disposed about a rotational shaft; cylindrical combustion chambers arranged around the rotational shaft to supply combustion gas to the turbine; a compressor rotatable about the rotational shaft to generate compressed air; and any one of the compressor diffusers described above.

With this configuration, the gas turbine can reduce pressure loss in the compressed air supplied from the compressor to the combustion chambers. Such a reduction in pressure loss mainly leads to a smaller power for driving the compressor, which can in turn increase the overall efficiency of the gas turbine.

Advantageous Effects of Invention

According to the present invention, pressure loss in compressed air supplied from the compressor to the combustion chambers can be reduced.

DETAILED DESCRIPTION OF THE INVENTION

The following describes embodiments of the present invention with reference to the accompanying drawings. The embodiments are not intended to limit the scope of the present invention. Components of the embodiments to be described below include components that can easily be replaced by those skilled in the art or components that are substantially the same.

First Embodiment

Figure 1:
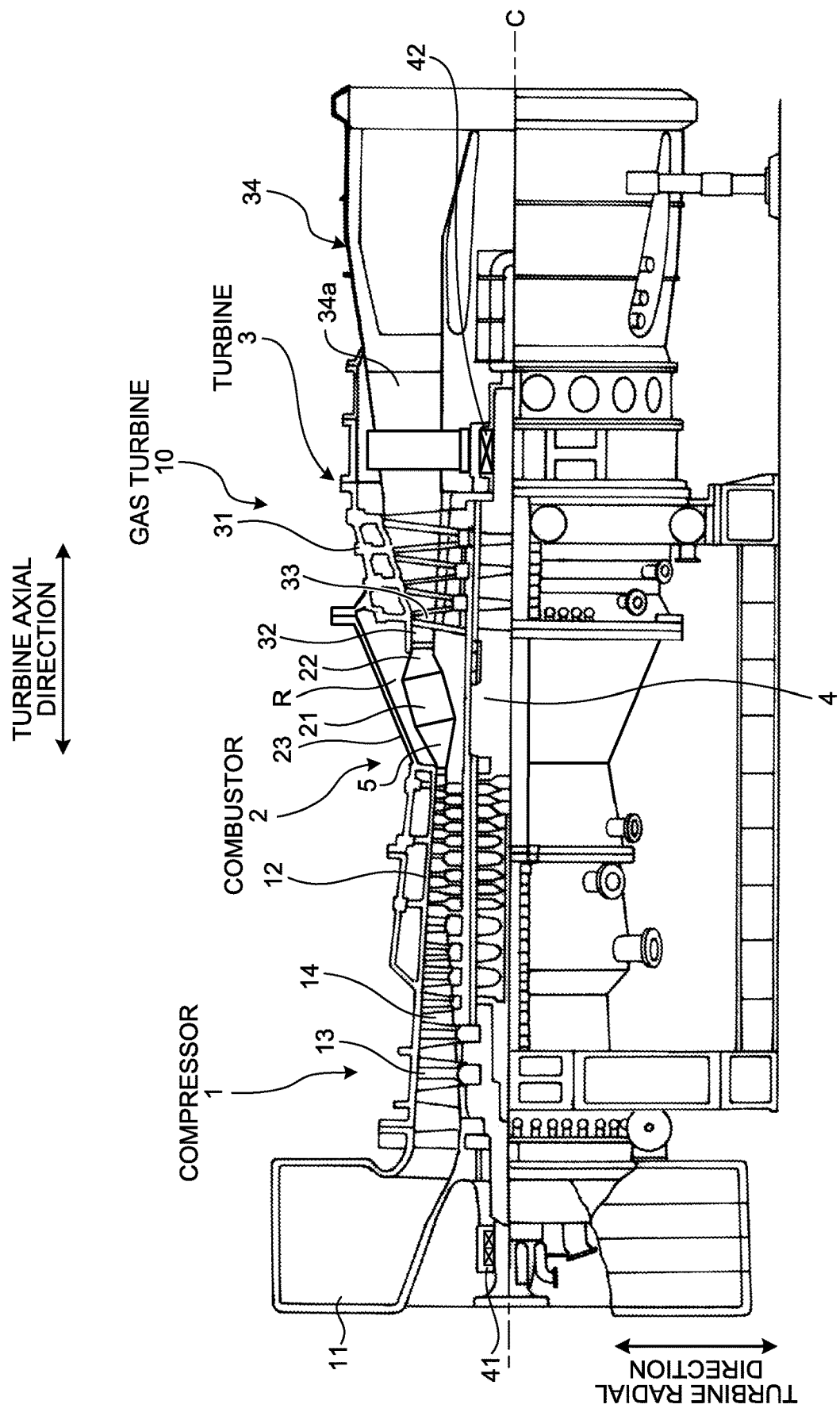
FIG. 1 is a diagram illustrating a general configuration of a gas turbine according to embodiments of the present invention.

FIG. 1 is a diagram illustrating a general configuration of a gas turbine according to the embodiments of the present invention.

As illustrated in FIG. 1, this gas turbine 10 includes a compressor 1, a combustor 2, and a turbine 3. The gas turbine 10 includes a turbine shaft 4 that is a rotational shaft passing through the center of the compressor 1, the combustor 2, and the turbine 3. The compressor 1, the combustor 2, and the turbine 3 are disposed in a row in this order from upstream to downstream of air flow along a center axis C of the turbine shaft 4. In the following description, a turbine axial direction refers to the direction parallel to the center axis C, a turbine circumferential direction refers to the circumferential direction about the center axis C, and a turbine radial direction refers to the direction perpendicular to the center axis C.

The compressor 1 is a device that compresses air to generate compressed air. The compressor 1 includes a cylindrical compressor casing 12 having an air intake 11 that draws in air, and compressor vanes 13 and compressor blades 14 provided in the compressor casing 12. The compressor vanes 13 are attached to the compressor casing 12 and are arranged in a row in the turbine circumferential direction. The compressor blades 14 are attached to the turbine shaft 4 and are arranged in a row in the turbine circumferential direction about the turbine shaft 4. The compressor vanes 13 and the compressor blades 14 are arranged alternately in the turbine axial direction.

The combustor 2 is a device that generates high-temperature high-pressure combustion gas by injecting fuel to the compressed air from the compressor 1. The combustor 2 includes combustion chambers 21 in which the compressed air mixes with the fuel and where combustion takes place, and includes transition pieces 22 that guide the combustion gas from the combustion chambers 21 to the turbine 3. The combustion chambers 21 (e.g., sixteen combustion chambers 21) are arranged in a row in the turbine circumferential direction about the turbine shaft 4 in the cylindrical combustor casing 23 that defines a combustor casing chamber R. The combustor chambers 21 are connected to the compressor 1 via compressor diffusers 5. The compressor diffusers 5 configure airflow paths that guide the compressed air from the compressor 1 to the combustion chambers 21. Details of the compressor diffusers 5 are described later.

The turbine 3 uses combustion gas burned in the combustor 2 to generate rotational power. The turbine 3 includes a cylindrical turbine casing 31 and turbine vanes 32 and turbine blades 33 provided in the turbine casing 31. The turbine vanes 32 are attached to the turbine casing 31 and arranged in a row in the turbine circumferential direction. The turbine blades 33 are attached to the turbine shaft 4 and arranged in a row in the turbine circumferential direction. The turbine vanes 32 and the turbine blades 33 are arranged alternately in the turbine axial direction. At the downstream of the turbine casing 31, an exhaust 34 including an exhaust diffuser 34a connected to the turbine 3 is disposed.

The turbine shaft 4 is rotatable about the center axis C with an end of the turbine shaft 4 close to the compressor 1 being supported by a bearing 41 and the other end close to the exhaust 34 being supported by a bearing 42. Although not illustrated, a drive shaft of a generator is connected to the end of the turbine shaft 4 close to the compressor 1.

In the gas turbine 10, as the air drawn into the air intake 11 passes through the compressor vanes 13 and the compressor blades 14, the compressor 1 increases pressure of the air, thereby generating high-temperature high-pressure compressed air. The compressed air mixes with fuel and combustion takes place in the combustor 2, thereby generating high-temperature high-pressure combustion gas. The combustion gas passes through the turbine vanes 32 and the turbine blades 33 of the turbine 3 to rotationally drive the turbine shaft 4, which in turn applies rotational power to the generator connected to the turbine shaft 4 to produce electricity. After rotationally driving the turbine shaft 4, flue gas passes through the exhaust diffuser 34a of the exhaust 34 and is discharged to the atmosphere as exhaust gas.

Figure 2:
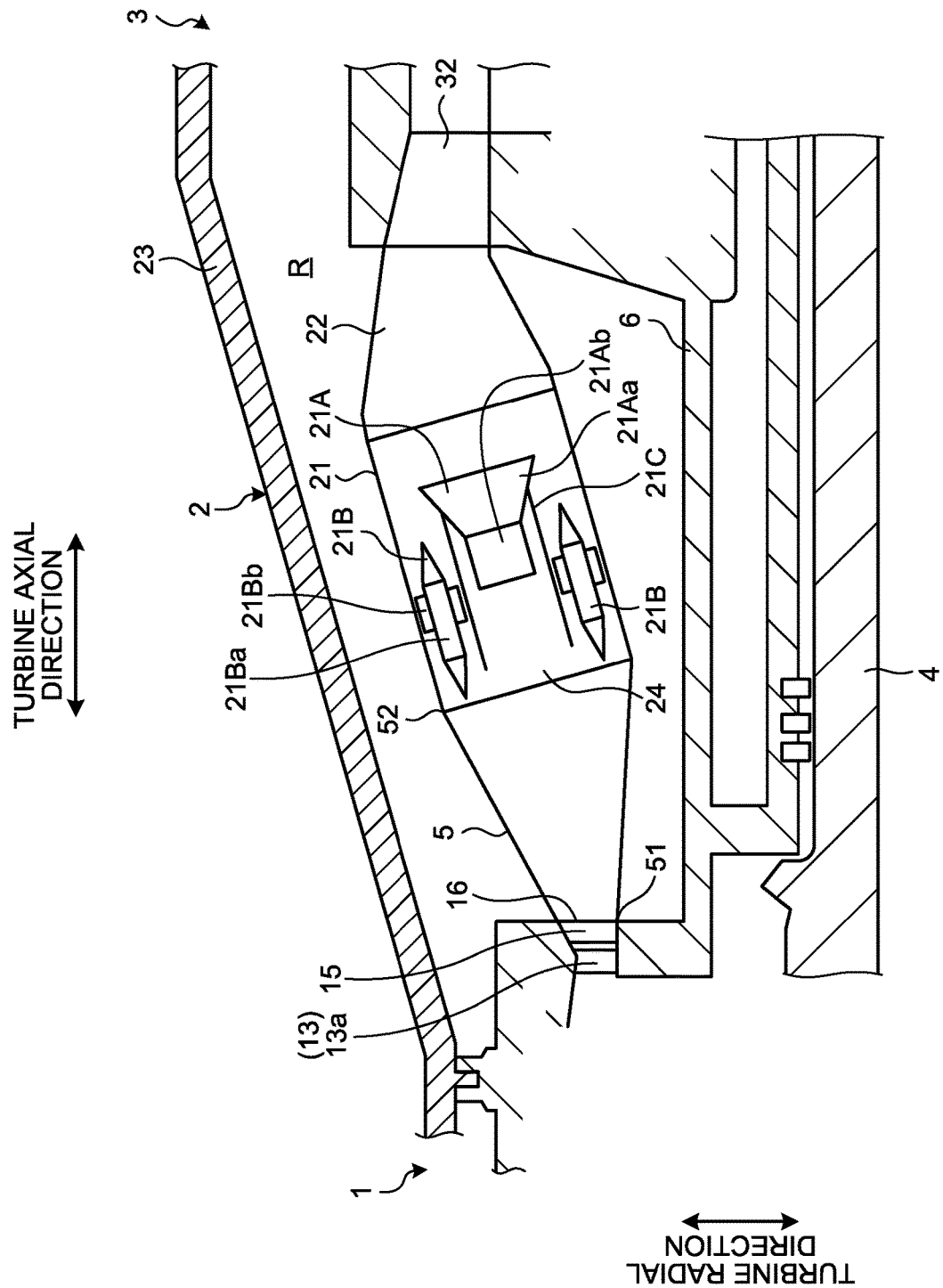
FIG. 2 is an enlarged sectional view of a combustor and its periphery in the gas turbine for illustrating a compressor diffuser according to a first embodiment of the present invention.
Figure 3:
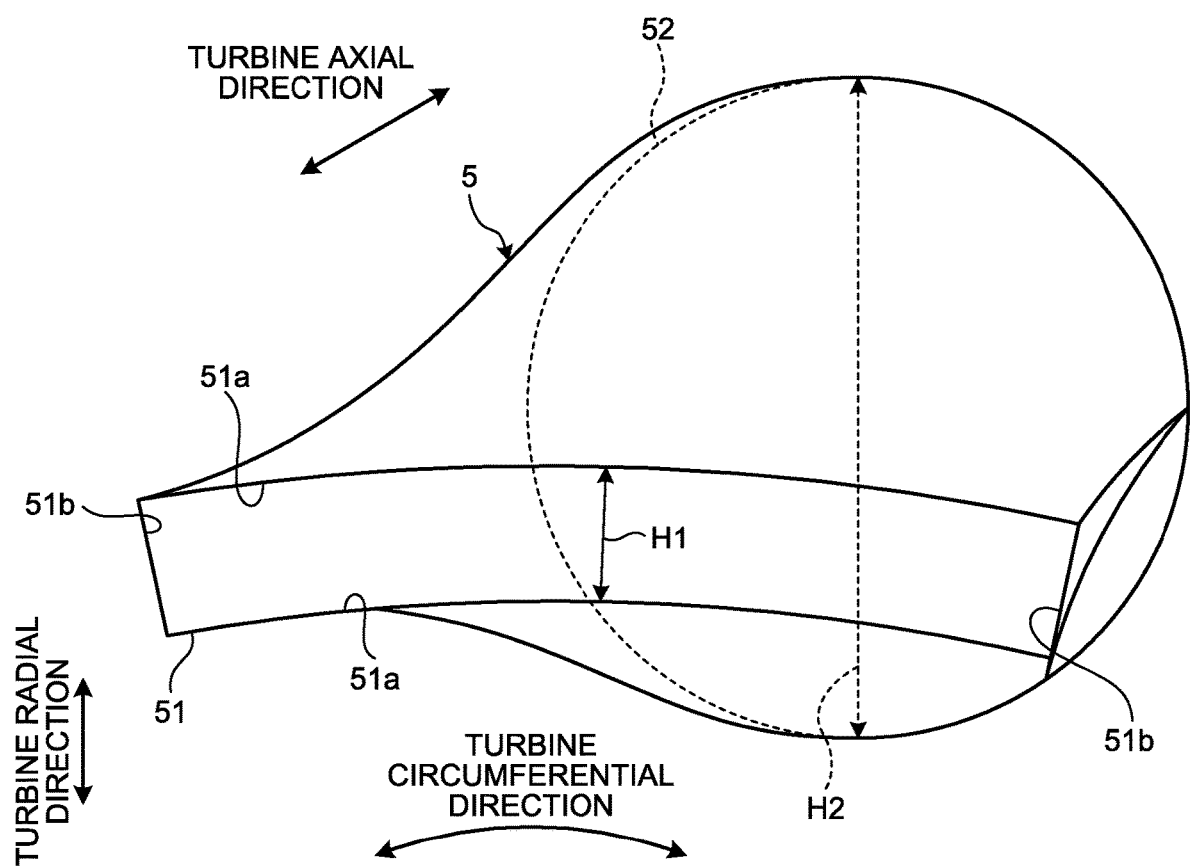
FIG. 3 is a perspective view of the compressor diffuser according to the first embodiment of the present invention.
Figure 4:
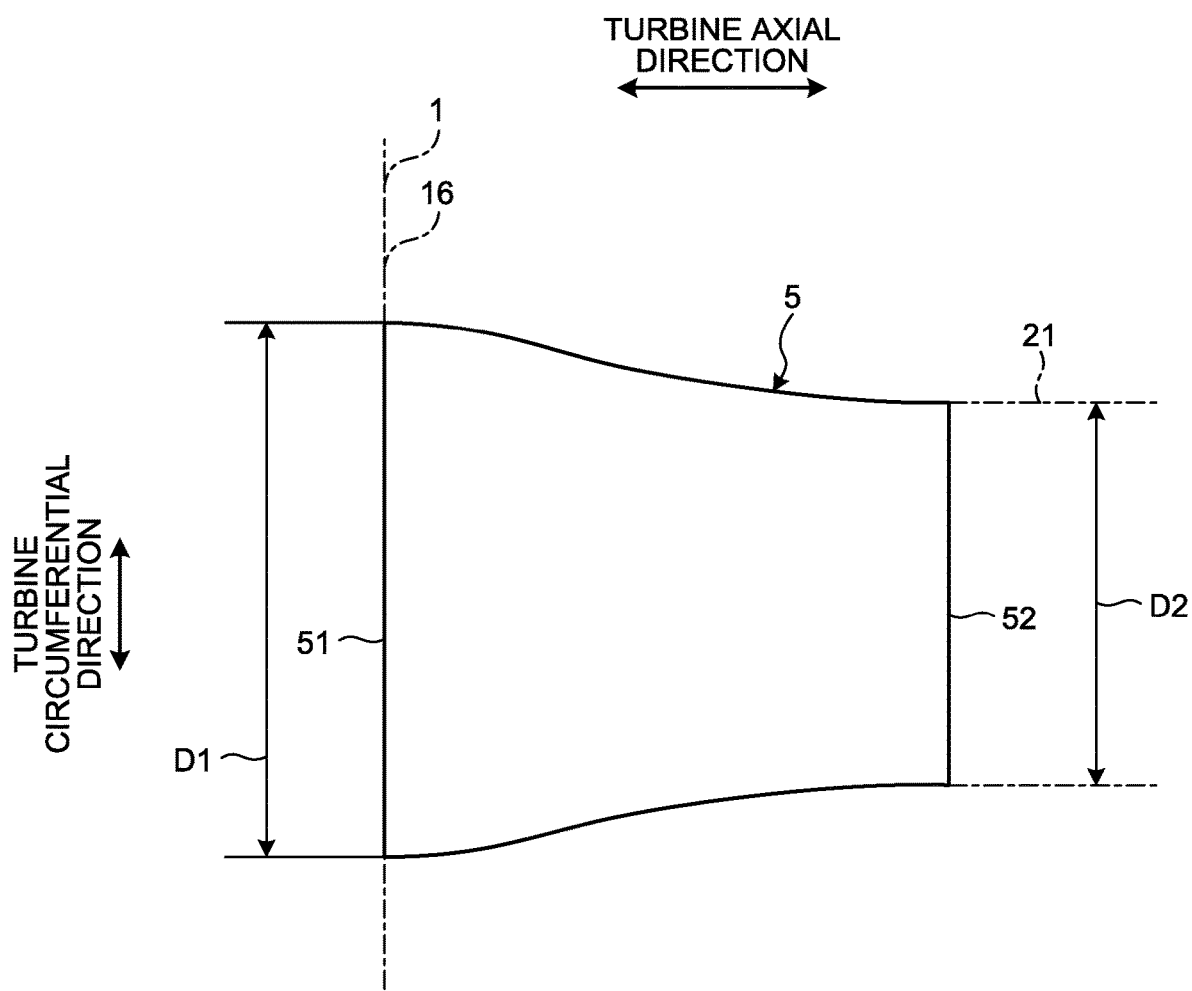
FIG. 4 is a diagram of the compressor diffuser according to the first embodiment of the present invention seen in a turbine radial direction.

FIG. 2 is an enlarged sectional view of the combustor and its periphery in the gas turbine for illustrating a compressor diffuser according to the first embodiment. FIG. 3 is a perspective view of the compressor diffuser according to the first embodiment. FIG. 4 is a diagram of the compressor diffuser according to the first embodiment seen in the turbine radial direction.

As illustrated in FIG. 2, this compressor diffuser 5 has a tubular shape with a first end end 51 connected to an outlet 16 of the compressor 1 and the other (a second) end 52 connected to an air inlet 24 of a combustion chamber 21 of the combustor 2. The compressor diffuser 5 connects the compressor 1 and the combustor 2 to configure an airflow path that guides the compressed air from the compressor 1 to the combustion chamber 21.

The compressor 1 includes, as described above, the cylindrical compressor casing 12 in which the compressor vanes 13 and the compressor blades 14 are arranged in a row in the turbine circumferential direction. Accordingly, the outlet 16 of the compressor 1 has an annular shape with the turbine shaft 4 being the center.

As described above, the combustion chambers 21 (e.g., sixteen combustion chambers 21) of the combustor 2 are arranged in a row in the turbine circumferential direction in the cylindrical combustor casing 23. As illustrated in FIG. 2, each combustion chamber 21 has a cylindrical shape and includes a pilot combustion burner 21A at the center thereof. The combustion chamber 21 includes a plurality of main combustion burners 21B that are arranged along the inner circumference of the combustion chamber 21 around the pilot combustion burner 21A. The pilot combustion burner 21A includes a pilot cone 21Aa supported by the combustion chamber 21 and a pilot nozzle 21Ab disposed in the pilot cone 21Aa. Each main combustion burner 21B includes a main nozzle 21Ba and a swirler vane 21Bb disposed around the outer circumference of the main nozzle 21Ba. In the combustion chamber 21, a pilot fuel line (not illustrated) is connected to the pilot nozzle 21Ab, and main combustion lines (not illustrated) are connected to the main nozzles 21Ba. The combustion chamber 21 includes an inner cylinder 21C surrounding the pilot combustion burner 21A. The inner cylinder 21C forms a passage for feeding compressed air to the pilot combustion burner 21A inside the inner cylinder 21C and forms a passage for feeding compressed air to the main combustion burners 21B outside the inner cylinder 21C. The combustion chamber 21 is disposed with the axis of the cylindrical shape aligned with the turbine axial direction and with the air inlet 24 that defines a cylindrical opening facing toward the outlet 16 of the compressor 1. When high-temperature high-pressure compressed air flows through the air inlet 24 into the combustion chamber 21, the compressed air mixes with the fuel injected from the main combustion burners 21B and becomes a swirl flow of premixed air. The compressed air mixes with the fuel injected from the pilot combustion burner 21A and is ignited by a spark (not illustrated) and burned, and the resulting combustion gas is ejected into the combustion chamber 21. Part of the combustion gas is ejected and spread into the combustion chamber 21 with flame, which in turn ignites and burns the premixed air flowing into the combustion chamber 21 from the main combustion burners 21B. In other words, diffusion flames of the pilot fuel injected from the pilot combustion burner 21A can help to maintain stable combustion of the lean premixed fuel from the main combustion burners 21B for keeping a flame.

Since a plurality of combustion chambers 21 are arranged in a row in the turbine circumference direction, as many compressor diffusers 5 as the combustion chambers 21 are arranged in a row in the turbine circumferential direction so that each compressor diffuser 5 connects the compressor 1 with a respective one of the combustion chambers 21. Since the outlet 16 of the compressor 1 has an annular shape, the one end 51 of each compressor diffuser 5 connected to the outlet 16 is formed in conformance with a shape of a divided portion of the annular shape of the outlet 16 of the compressor 1, the divided portion being one of as many divided portions of the annular shape as the combustion chambers 21. Specifically, as illustrated in FIG. 3, the first end 51 of the compressor diffuser 5 has a substantially rectangular shape constituting a part of a sector shape. The first end 51 has a single-annular outline defining an opening and includes double arc portions 51a curving in the turbine circumference direction about the turbine shaft 4 and side portions 51b connecting respective ends of the double arc portions 51a. The side portions 51b divide the annular shape of the outlet 16 of the compressor 1 into as many portions as the combustion chambers 21. The second end 52 of each compressor diffuser 5, which is connected to the air inlet 24 of a corresponding cylindrical combustion chamber 21, has a single-annular outline defining a circular opening shaped in conformance with the cylindrical shape of the combustion chamber 21. The compressor diffuser 5 has a continuous shape from the first end 51 to the second end 52 in the turbine shaft direction, and has a varying tubular shape from a substantially rectangular shape constituting a part of a sector shape into a circular shape.

Since the outlet 16 of the compressor 1 has a smaller diameter than that of the inlet of the compressor 1 to compress air, and the air inlet 24 of each combustion chamber 21 has a relatively large diameter to draw a sufficient flow rate of compressed air, each compressor diffuser 5 is formed, as illustrated in FIG. 3, such that the first end 51, which is close to the compressor 1, has a turbine radial direction dimension H1 between the double arc portions 51a that is approximately a dimension of the outlet 16 of the compressor 1 and the second end 52, which is close to the combustion chamber 21, has a turbine radial direction dimension H2 that is appropriately a diameter of the cylindrical combustion chamber 21. The turbine radial direction dimension H2 of the other second end 52 is larger than the turbine radial direction dimension H1 of the first end 51. Since the outlet 16 of the compressor 1 has a continuous annular shape and the combustion chambers 21 are arranged in a row in the turbine circumferential direction each having the air inlet 24 defining a cylindrical opening, each compressor diffuser 5 is formed, as illustrated in FIG. 4, such that the first end 51, which is close to the compressor 1, has a turbine circumferential direction dimension D1 corresponding to a dimension of a divided portion of the annular shape of the outlet 16 of the compressor 1, the divided portion being one of as many divided portions as the combustion chambers 21, and the second end 52, which is close to the combustion chambers 21, has a turbine circumferential direction dimension D2 that is approximately the diameter of the cylindrical combustion chambers 21. The turbine circumferential direction dimension D2 of the second end 52 is smaller than the turbine circumferential direction dimension D1 of the first end 51. With regard to the relation between the turbine radial direction dimensions H1 and H2 and the relation between the turbine circumferential direction dimensions D1 and D2, the compressor diffuser 5 is formed to have a gradually increasing path cross section taken in the turbine radial direction from the first end 51 to the second end 52. In other words, the compressor diffuser 5 according to the first embodiment converts dynamic pressure of the compressed air generated by the compressor 1 into static pressure and supplies the compressed air to the combustion chamber 21 of the combustor 2.

The compressor diffuser 5 according to the first embodiment has the first end 51 connected to the outlet 16 of the compressor 1 and the second end 52 connected to the air inlet 24 of a corresponding combustion chamber 21. The first end 51 defines an opening and has the double arc portions 51a curving about the turbine shaft 4. The second end 52 defines an opening shaped in conformance with the cylindrical shape of the combustion chamber 21. The compressor diffuser 5 is disposed continuously along the extending direction of the turbine shaft 4 from the first end 51 to the second end 52.

The compressor diffuser 5 directly supplies compressed air generated by the compressor 1 to the corresponding combustion chamber 21 in the combustor 2. Compared to a structure that supplies compressed air generated by the compressor 1 to the combustor casing chamber R, such a direct supply of the compressed air prevents reverse flow of the compressed air and also prevents sudden expansion of the compressed air, which leads to a smaller pressure loss in the compressed air. As a result, pressure loss in the compressed air supplied from the compressor 1 to the combustion chamber 21 can be reduced.

The gas turbine 10 including the compressor diffusers 5 can reduce pressure loss in compressed air supplied from the compressor 1 to the combustion chambers 21. Such a reduction in pressure loss mainly leads to a smaller power for driving the compressor, which can in turn increase the overall efficiency of the gas turbine 10.

Second Embodiment

Figure 5:
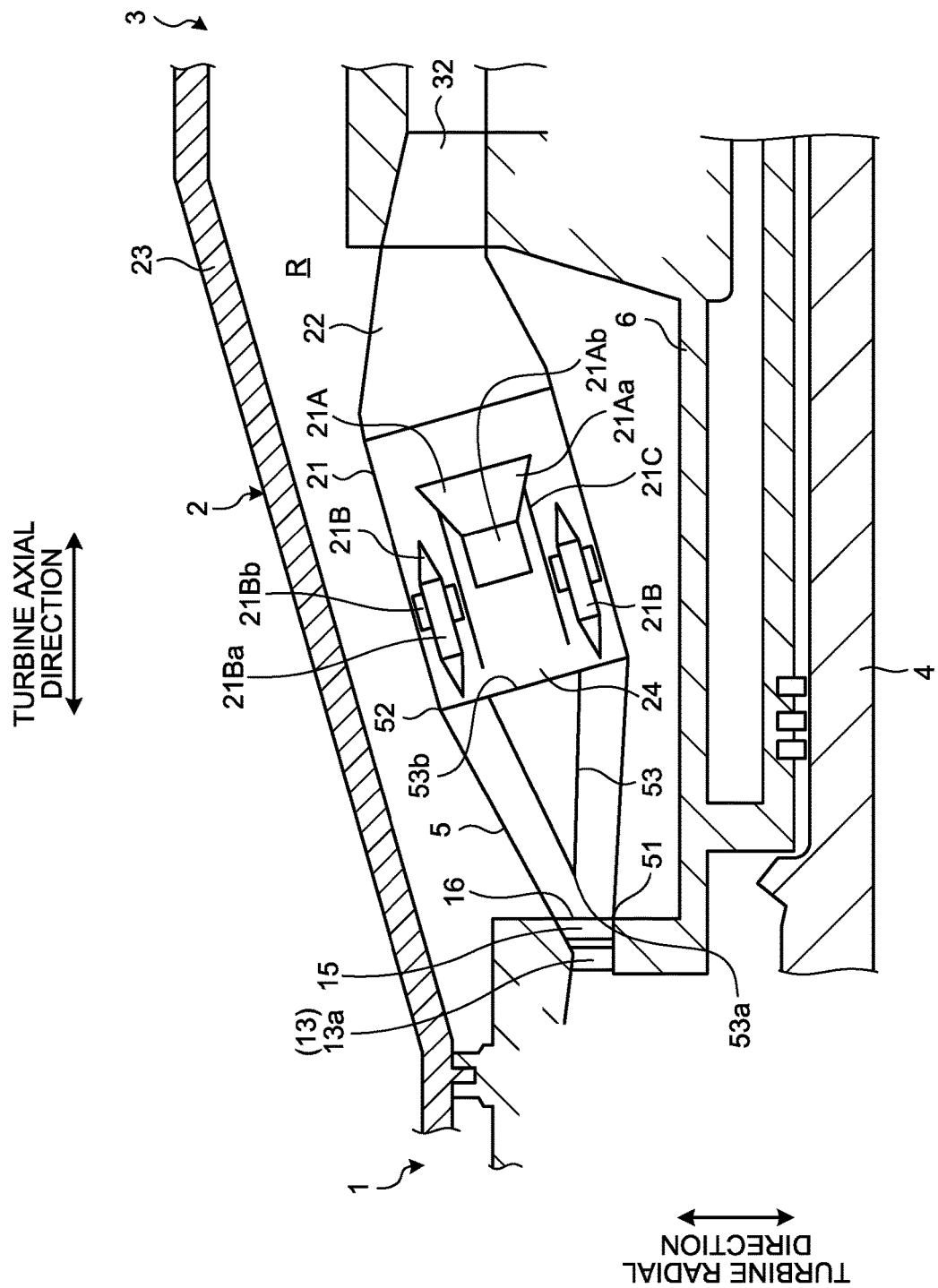
FIG. 5 is an enlarged sectional view of the combustor and its periphery in the gas turbine for illustrating a compressor diffuser according to a second embodiment of the present invention.
Figure 6:
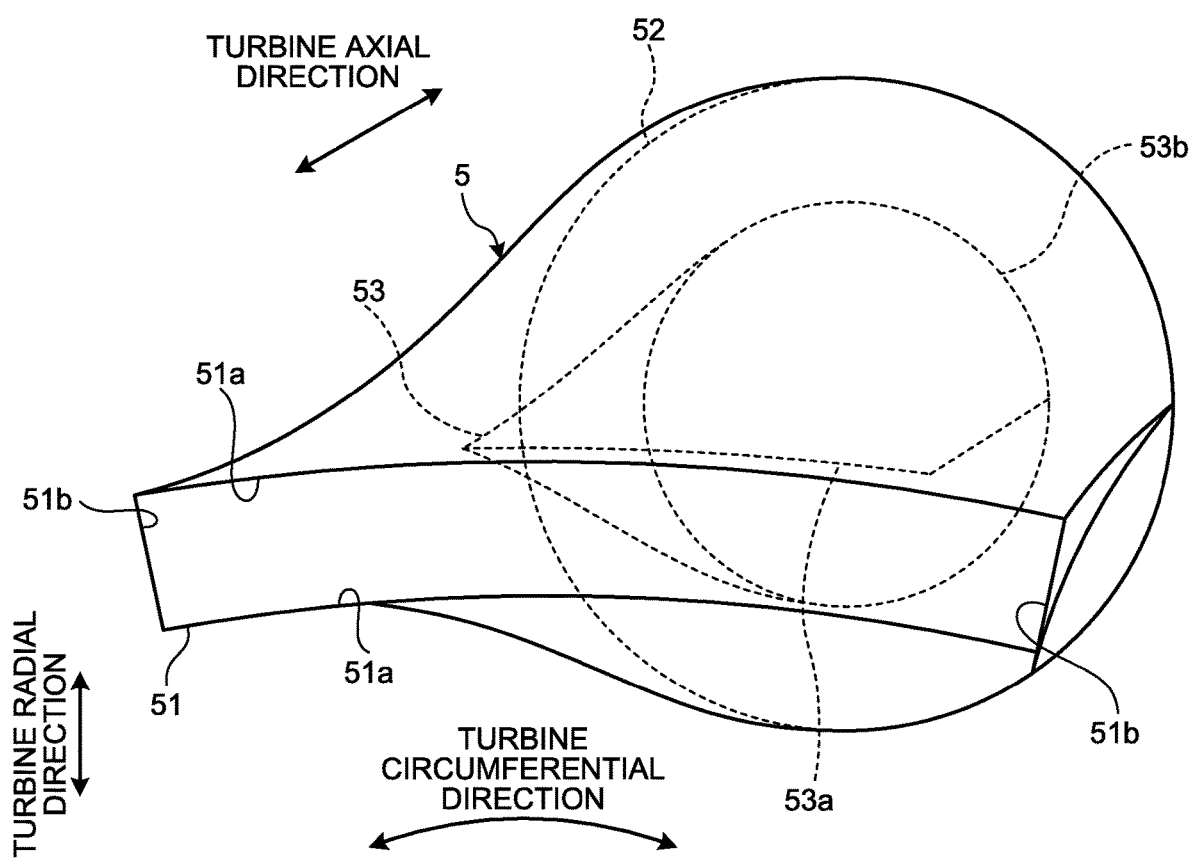
FIG. 6 is a perspective view of the compressor diffuser according to the second embodiment of the present invention.

FIG. 5 is an enlarged sectional view of the combustor and its periphery in the gas turbine for illustrating a compressor diffuser according to a second embodiment of the present invention. FIG. 6 is a perspective view of the compressor diffuser according to the second embodiment.

As illustrated in FIGS. 5 and 6, the compressor diffuser 5 according to the second embodiment differs from the first embodiment in that it includes an inner member 53, and other configurations of the second embodiment are identical to those of the first embodiment. In the second embodiment, like parts similar to those described in the first embodiment are similarly numbered and the explanations thereof are omitted.

The inner member 53 is disposed inside the compressor diffuser 5. The inner member 53 has a front end portion 53a facing toward the first end 51 and a rear end portion 53b at the second end 52 in the compressor diffuser 5. The front end portion 53a is at the center of the turbine radial direction dimension at a position at which the front end portion 53a is located in the compressor diffuser 5, and has a shape of a curvilinear arc curving in the turbine circumferential direction about the turbine shaft 4. The front end portion 53a is shorter than the turbine circumferential direction dimension of the compressor diffuser 5 at the portion at which the front end portion 53a is located in the compressor diffuser 5. The rear end portion 53b has a circular shape having a smaller diameter than that of the other end 52 of the compressor diffuser 5. The inner member 53 has a continuous shape from the curvilinear front end portion 53a to the circular rear end portion 53b in the turbine axial direction and varies from a curvilinear shape into a circular shape. In other words, the inner member 53 has a gradually varying shape from the curvilinear, beak-shaped front end portion 53a to the circular rear end portion 53b. The inner member 53 has a shape substantially similar to and smaller than the external shape of the compressor diffuser 5. The inner member 53 is supported by a supporting member (not illustrated) in the compressor diffuser 5 and is disposed in a floating manner with no contact with the inner surface of the compressor diffuser 5. The rear end portion 53b of the inner member 53 may be closed by a plate. The inner member 53 may be hollow or solid.

With the inner member 53, the compressor diffuser 5 has the first end 51 having a single-annular outline and the other end 52, together with the rear end portion 53b, having a double-annular outline defining a ring-shaped opening. The circular rear end portion 53b is disposed close to the position of the inner cylinder 21C of the combustion chamber 21 and has a diameter close to that of the inner cylinder 21C. The ring-shaped opening of the other end 52 faces the main combustion burners 21B.

The compressor diffuser 5 includes the inner member 53 with which the first end 51 has a single-annular outline and the other end 52 has a double-annular outline. This structure forms an annular current of compressed air to be supplied to the combustion chamber 21 in conformance with the cylindrical shape of the combustion chamber 21. This configuration adjusts the supply distribution of the compressed air to the combustion chamber 21. As a result, combustion efficiency of the combustion chamber 21 can be increased. In the second embodiment, in particular, compressed air is mainly supplied to the passage in which the main combustion burners 21B are disposed and the supply distribution of compressed air can be adjusted between the main combustion burners 21B and the pilot combustion burner 21A. As a result, combustion efficiency of the combustion chamber 21 can be increased.

The gas turbine 10 including the compressor diffusers 5 can increase combustion efficiency of the combustion chambers 21. As a result, mainly the overall efficiency of the gas turbine 10 can be increased.

Third Embodiment

Figure 7:
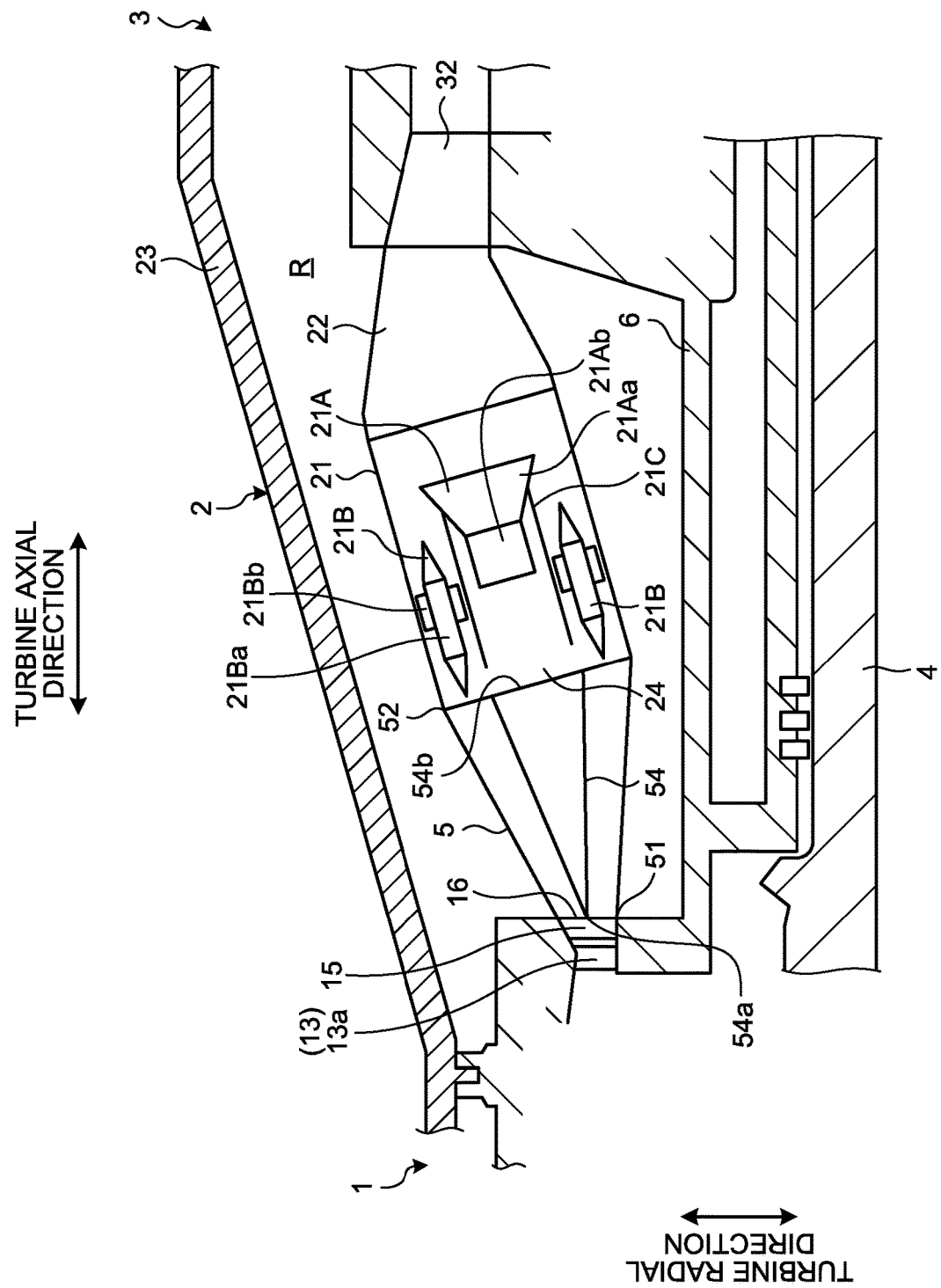
FIG. 7 is an enlarged sectional view of the combustor and its periphery in the gas turbine for illustrating a compressor diffuser according to a third embodiment of the present invention.
Figure 8:
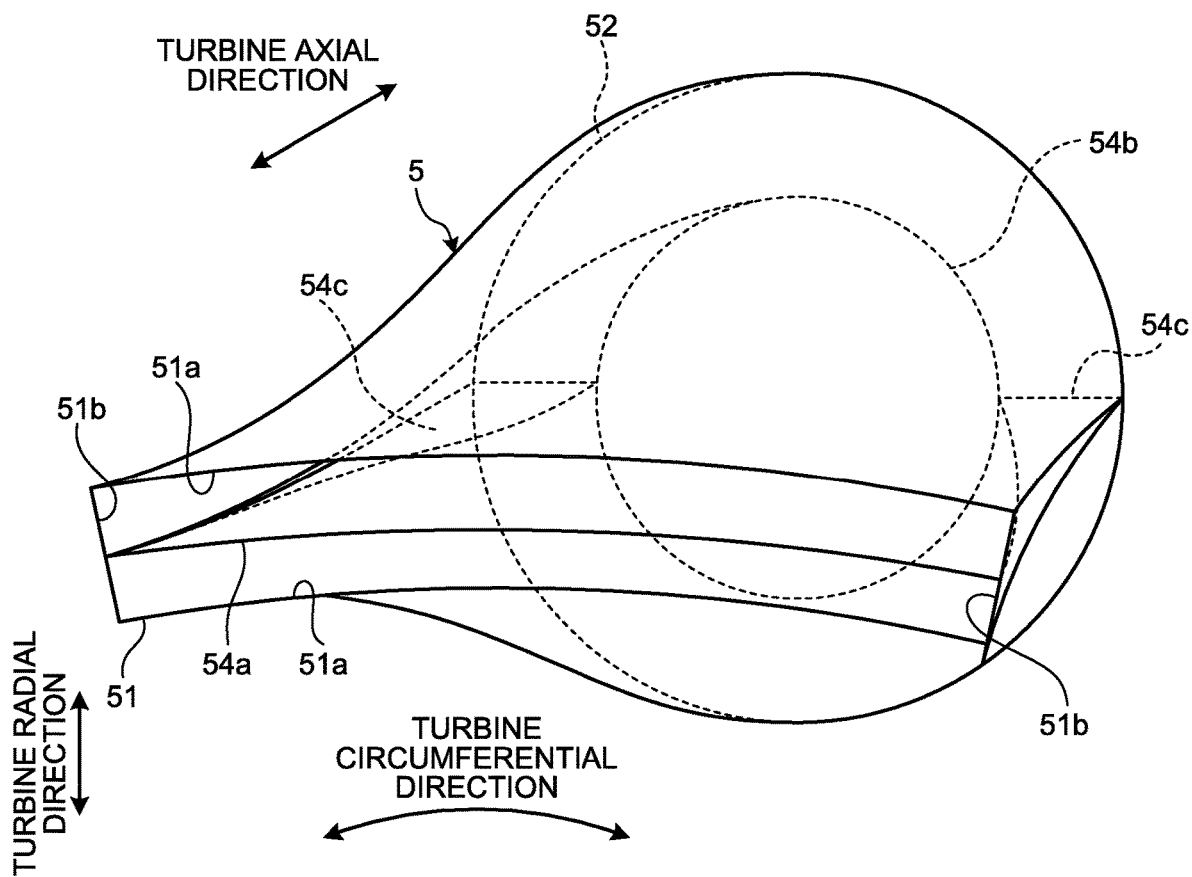
FIG. 8 is a perspective view of the compressor diffuser according to the third embodiment of the present invention.
Figure 9:
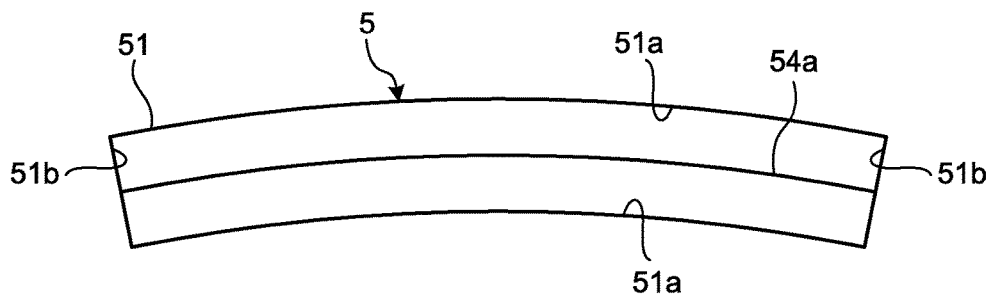
FIG. 9 is a one-end view of the compressor diffuser according to the third embodiment of the present invention.
Figure 10:
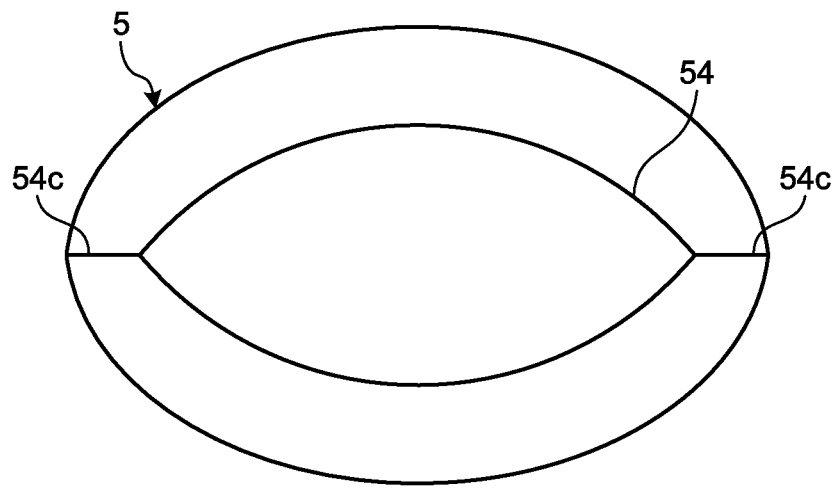
FIG. 10 is a cross-sectional view of the compressor diffuser according to the third embodiment of the present invention taken in a middle of a turbine axial direction.
Figure 11:
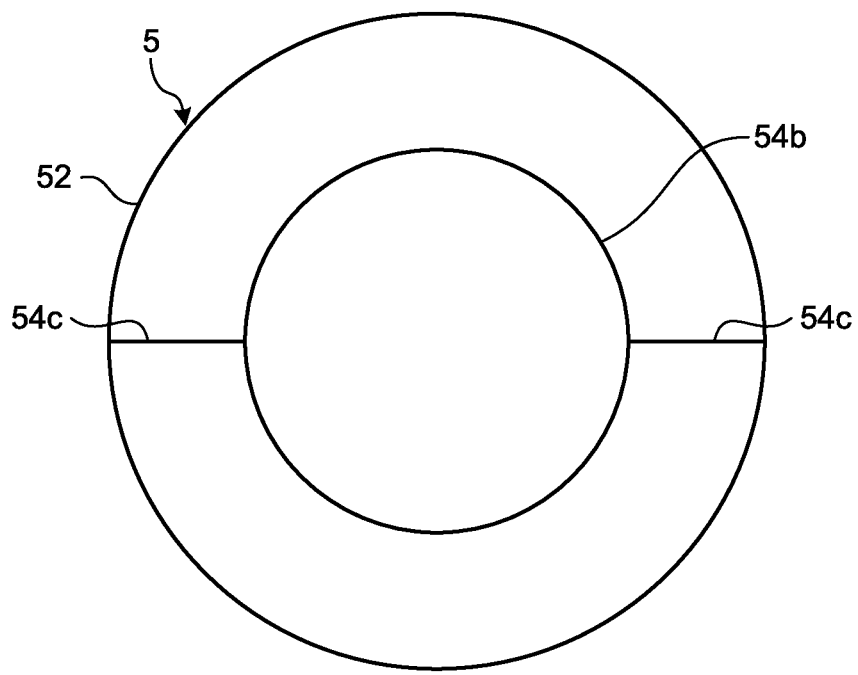
FIG. 11 is an other-end view of the compressor diffuser according to the third embodiment of the present invention.

FIG. 7 is an enlarged sectional view of the combustor and its periphery in the gas turbine for illustrating a compressor diffuser according to a third embodiment. FIG. 8 is a perspective view of the compressor diffuser according to the third embodiment. FIG. 9 is a one-end view of the compressor diffuser according to the third embodiment. FIG. 10 is a cross-sectional view of the compressor diffuser according to the third embodiment taken in a middle of the turbine axial direction. FIG. 11 is an another-end view of the compressor diffuser according to the third embodiment.

As illustrated in FIGS. 7 and 11, the compressor diffuser 5 according to the third embodiment differs from the first embodiment in that it includes a separating member 54, and other configurations of the third embodiment are identical to those of the first embodiment. In the third embodiment, like parts similar to those described in the first embodiment are similarly numbered and the explanations thereof are omitted.

The separating member 54 is disposed inside the compressor diffuser 5. The separating member 54 has a front end portion 54a at the one end 51 and a rear end portion 54b at the other end 52 in the compressor diffuser 5. The front end portion 54a is at the center of the turbine radial direction dimension of the compressor diffuser 5 at the one end 51 and at the center between the double arc portions 51a. The front end portion 54a has a shape of a curvilinear arc curving in the turbine circumferential direction about the turbine shaft 4. Opposite ends of the front end portion 54a reach the side portions 51b. The rear end portion 54b has a circular shape having a smaller diameter than that of the other end 52 of the compressor diffuser 5. The separating member 54 has a continuous shape from the curvilinear front end portion 54a to the circular rear end portion 54b in the turbine axial direction and varies from a curvilinear shape into a circular shape. In other words, the separating member 54 has a gradually varying shape from the curvilinear, beak-shaped front end portion 54a to the circular rear end portion 54b. The separating member 54 has a shape substantially similar to and smaller than the external shape of the compressor diffuser 5 toward the other end 52 of the compressor diffuser 5. The separating member 54 includes separating plates 54c at opposite outer sides of the separating member 54. The separating plates 54c have a continuous shape from the curvilinear front end portion 54a to the circular trailing end portion 54 and are disposed at the opposite outer sides of the separating member 54. The separating plates 54c are integrally formed with the inner surface of the compressor diffuser 5 to divide the airflow path of the compressor diffuser 5 into two paths. The rear end portion 54b of the separating member 54 may be closed by a plate. The separating member 54 may be hollow or solid.

With the separating member 54, the compressor diffuser 5 has the one end 51 divided into two portions by the front end portion 54a and the other end 52, together with the rear end portion 54b, having a double-annular outline defining a ring-shaped opening. The compressor diffuser 5 is divided into two portions by the separating plates 54c from the one end 51 to the other end 52. The circular rear end portion 54b is disposed close to the position of the inner cylinder 21C of the combustion chamber 21 and has a diameter close to that of the inner cylinder 21C. The ring-shaped opening of the other end 52 faces the main combustion burners 21B.

The compressor diffuser 5 includes the separating member 54 to divide an airflow path into two paths that are continuous from the one end 51 to the other end 52. Compared to a structure in which the airflow path is not divided, this structure reduces expansion angles of air in each airflow path, thereby reducing pressure loss. In the third embodiment, compressed air is mainly supplied to the passage in which the main combustion burners 21B are disposed and the supply distribution of compressed air can be adjusted between the main combustion burners 21B and the pilot combustion burner 21A. As a result, combustion efficiency of the combustion chamber 21 can be increased.

The gas turbine 10 including the compressor diffusers 5 can reduce pressure loss in compressed air supplied from the compressor 1 to the combustion chambers 21. Such a reduction in pressure loss mainly leads to a smaller power for driving the compressor, which can in turn increase the overall efficiency of the gas turbine 10.

Fourth Embodiment

Figure 12:
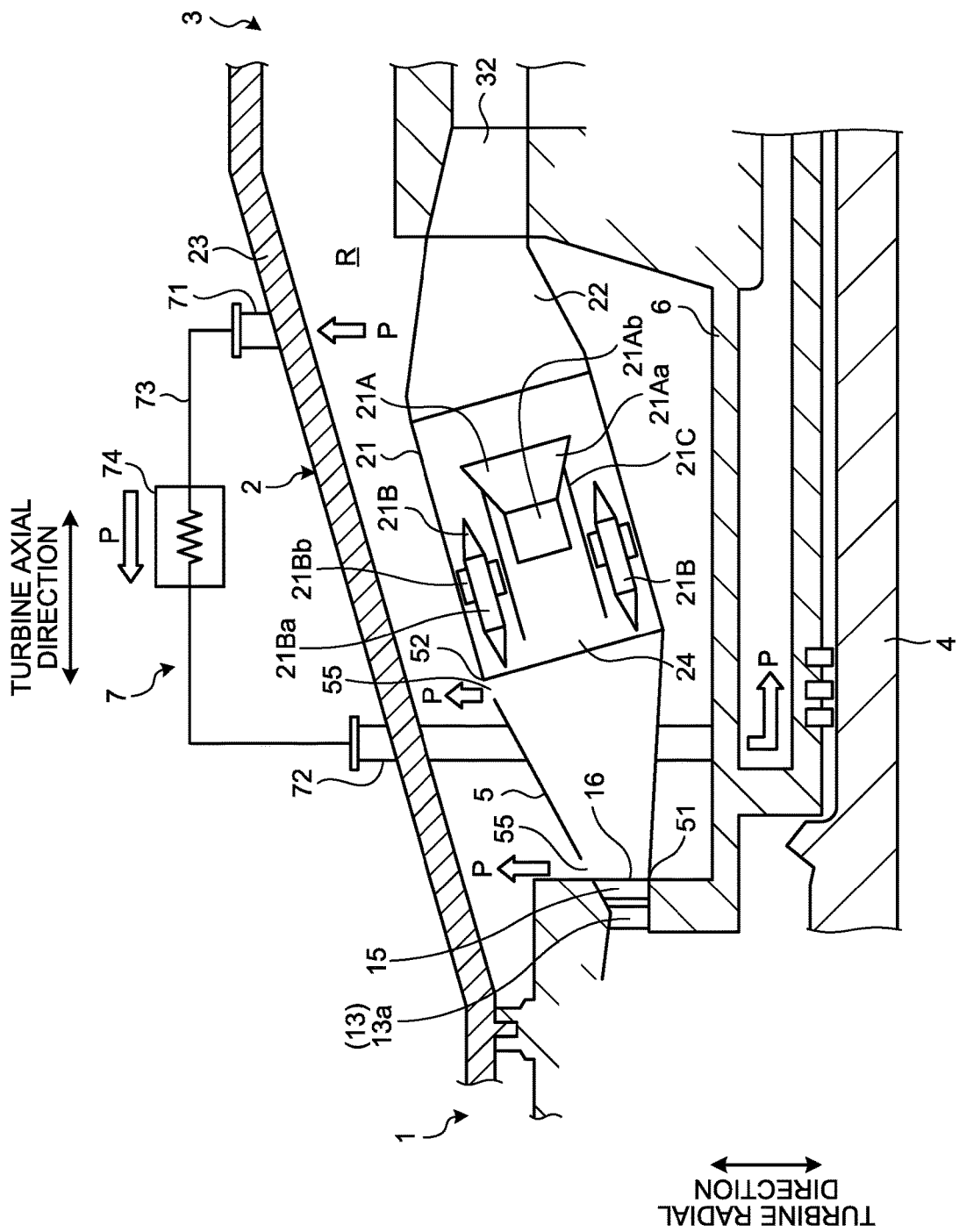
FIG. 12 is an enlarged sectional view of the combustor and its periphery in the gas turbine for illustrating a compressor diffuser according to a fourth embodiment of the present invention.

FIG. 12 is an enlarged sectional view of the combustor and its periphery in the gas turbine for illustrating a compressor diffuser according to a fourth embodiment.

The compressor diffuser 5 according to the fourth embodiment includes an air bleed port 55, and other configurations of the fourth embodiment are identical to those of the first to third embodiments above. In the fourth embodiment, like parts similar to those described in the first to third embodiments are similarly numbered and the explanations thereof are omitted.

The air bleed port 55 is an aperture for air communication between inside and outside of the compressor diffuser 5 to bleed compressed air from the compressor diffuser 5. The air bleed port 55 is provided at at least one of the one end 51 and the other end 52 of the compressor diffuser 5. The air bleed port 55 is, for example, an aperture formed at an edge portion of the one end 51 or at an edge portion of the other end 52 of the compressor diffuser 5. Through the air bleed port 55, part of compressed air P supplied from the compressor 1 to the combustion chamber 21 via the compressor diffuser 5 is bled into the cylindrical combustor casing 23 that defines the combustor casing chamber R.

With regard to the air bleed port 55, as illustrated in FIG. 12, the gas turbine 10 includes a ring-shaped intermediate shaft cover 6 attached to the outer circumference of the turbine shaft 4 in the turbine circumferential direction. The combustor casing chamber R is located around the outer circumference of the intermediate shaft cover 6 and outside of the combustion chambers 21 in the combustor casing 23.

The gas turbine 10 further includes a cooling device 7. The cooling device 7 includes an air discharge pipe 71 from the combustor casing chamber R to the outside of the combustor casing 23, an air supply pipe 72 from the outside of the combustor casing 23 through the combustor casing 23 to the inside of the intermediate shaft cover 6 (to the turbine shaft 4), a cooling air pipe 73 connecting the air discharge pipe 71 with the air supply pipe 72, and a heat exchanger (TCA cooler) 74 provided in the middle of the cooling air pipe 73.

The compressed air P bled by the air bleed port 55 to the combustor casing chamber R is discharged through the air discharge pipe 71 to the cooling air pipe 73 outside of the combustor casing 23, and then heat exchange takes place at the heat exchanger 74 between the compressed air P and coolant. The cooled compressed air P passes through the air supply pipe 72 to the inside of the intermediate shaft cover 6. The cooled compressed air P can cool, for example, the turbine vanes 32, the turbine blades 33, and the turbine shaft 4.

The compressor diffuser 5 has the air bleed port 55 at at least one of the one end 51 and the other end 52. If the air bleed port 55 is disposed at the one end 51, low-velocity compressed air is bled, since the compressed air at the perimeter of the one end 51 in the compressor diffuser 5 has a lower velocity distribution. Bleeding the lower velocity compressed air leads to a reduction in pressure loss. If the air bleed port 55 is disposed at the other end 52, higher-pressure compressed air is bled, which can cool high-pressure components.

The gas turbine 10 including the compressor diffusers 5 can reduce pressure loss in compressed air supplied from the compressor 1 to the combustion chambers 21. Such a reduction in pressure loss mainly leads to a smaller power for driving the compressor, which can in turn increase the overall efficiency of the gas turbine 10.

Fifth Embodiment

Figure 13:
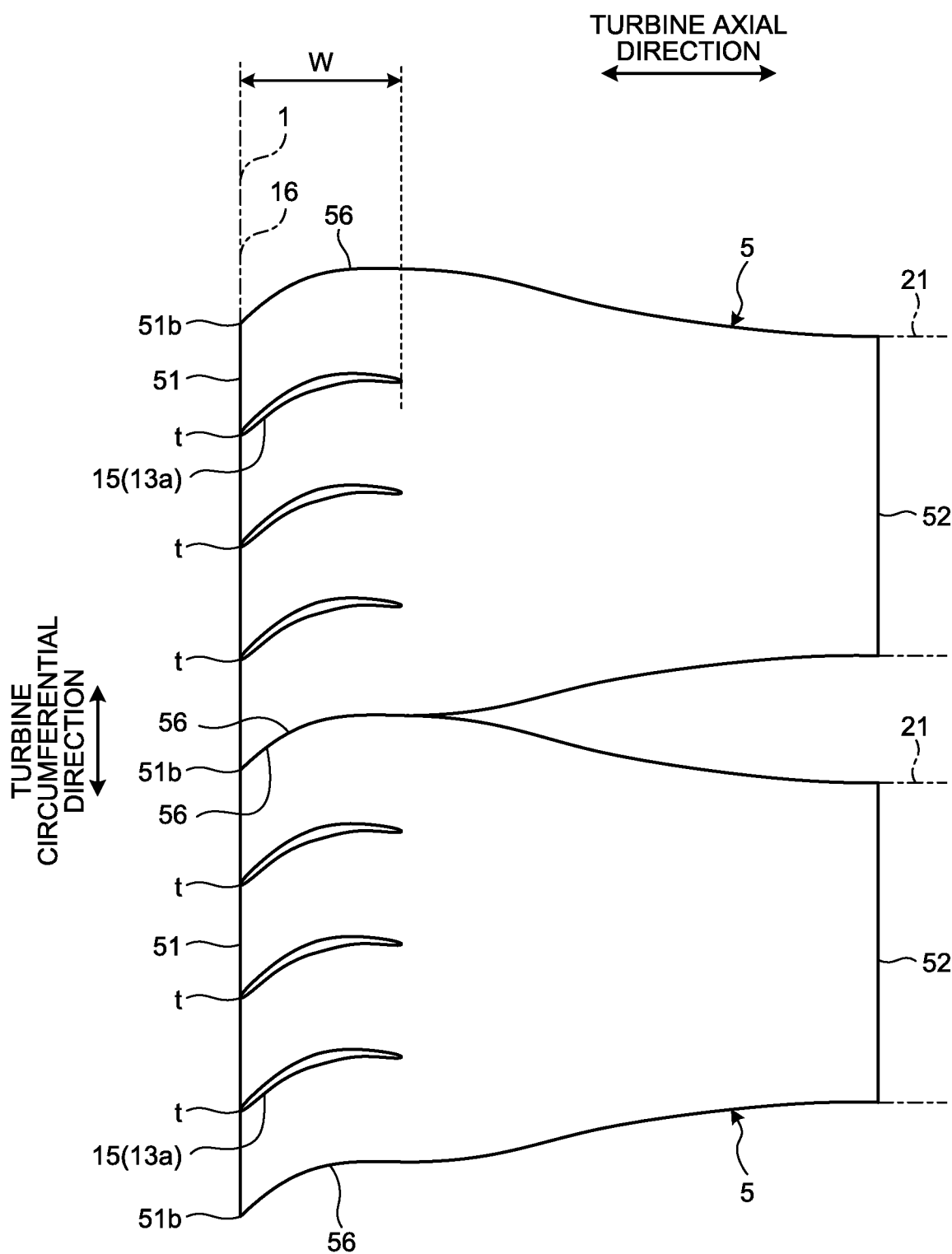
FIG. 13 is a diagram of a compressor diffuser according to a fifth embodiment of the present invention seen in the turbine radial direction.
Figure 14:
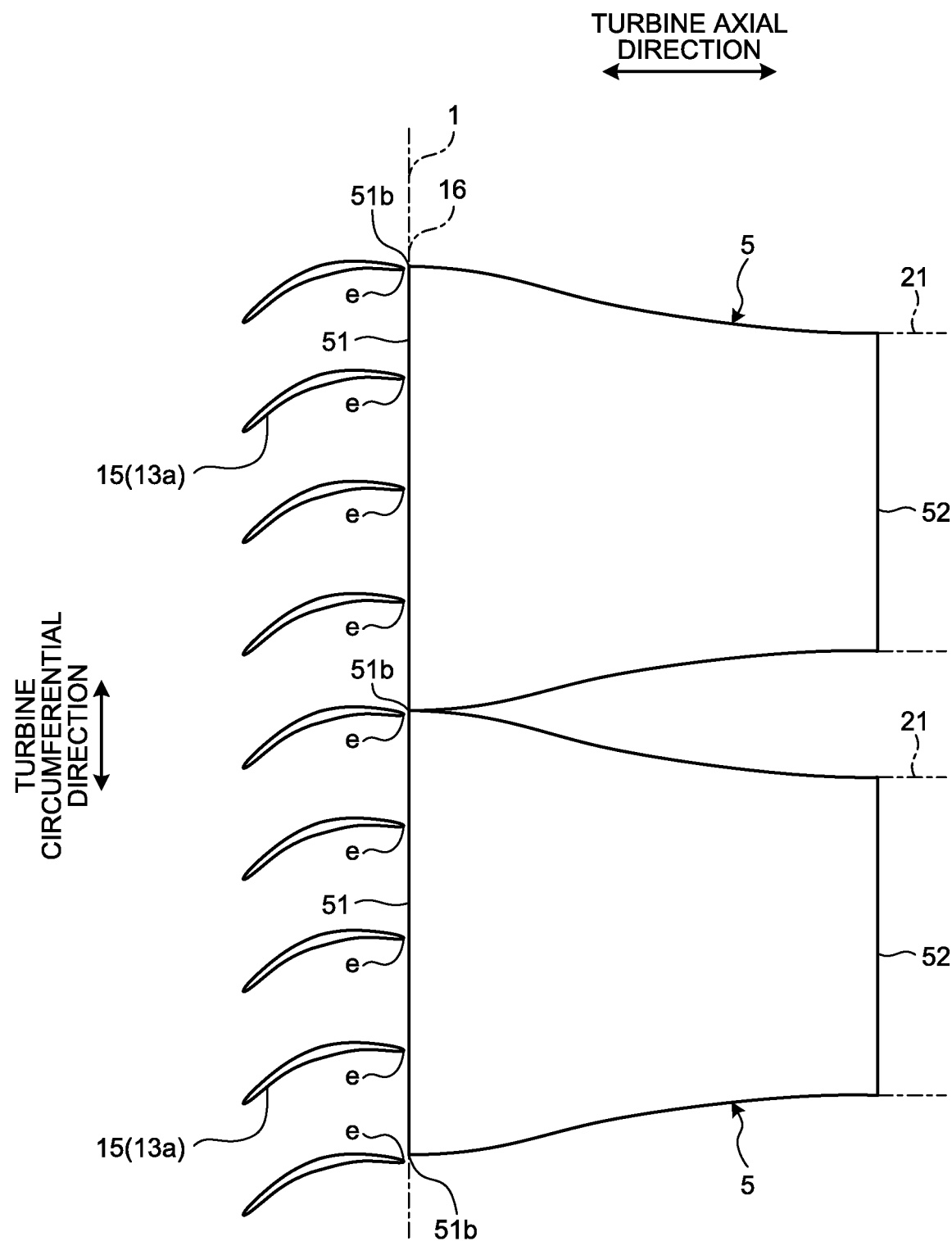
FIG. 14 is another diagram of the compressor diffuser according to the fifth embodiment of the present invention seen in the turbine radial direction.

FIGS. 13 and 14 are diagrams of a compressor diffuser according to a fifth embodiment seen in the turbine radial direction.

As illustrated in FIGS. 2, 5, 7, and 12, the compressor 1 includes last stage vanes 13a at the outlet 16. The last stage vanes 13a are arranged in a row in the turbine circumferential direction. The compressor 1 may include exit guide vanes 15 at downstream of the last stage vanes 13a at the outlet 16. The exit guide vanes 15 are arranged in a row in the turbine circumferential direction.

The compressor diffuser 5 according to the fifth embodiment is provided in accordance with the last stage vanes 13a or the exit guide vanes 15, and other configurations of the fifth embodiment are identical to those of the first to the fourth embodiments above. In the fifth embodiment, like parts similar to those described in the first to fourth embodiments are similarly numbered and the explanations thereof are omitted.

The compressor diffusers 5 illustrated in FIG. 13 are disposed with their one ends 51 being connected to the outlet 16 of the compressor 1 and accommodate vanes (last stage vanes 13a or exit guide vanes 15) disposed at the outlet 16 inside the one ends 51. The compressor diffusers 5 are disposed with their one ends 51 aligned with front ends t (upstream ends relative to the compressed air flow) of the vanes (last stage vanes 13a or exit guide vanes 15). Each compressor diffuser 5 has side walls 56 extending from the side portions 51b of the one end 51 to the other end 52 in the turbine radial direction to divide the flow path in the turbine circumferential direction. The side walls 56 in a range W in the turbine axial direction in which vanes (last stage vanes 13a or exit guide vanes 15) are accommodated are formed in conformance with the shape of the vanes (last stage vanes 13a or exit guide vanes 15) adjacent to the side walls 56 in the turbine circumferential direction. The adjacent compressor diffusers 5 are contiguously disposed in the turbine circumferential direction with the side portions 51b of the one ends 51 being aligned in the turbine circumferential direction and with adjacent side walls 56 being in contact with each other.

The compressor diffuser 5 accommodates vanes (last stage vanes 13a or exit guide vanes 15) disposed at the outlet 16 of the compressor 1 inside the one end 51. The compressor diffuser 5 has the side walls 56, which are close to the one end 51, in the turbine radial direction to divide the flow path in the turbine circumferential direction. The side walls 56 are shaped in conformance with the shape of the vanes. This structure can reduce turbulence of the compressed air flowing along the side walls 56, thereby reducing pressure loss in the compressed air.

The compressor diffusers 5 illustrated in FIG. 14 are disposed with their one ends 51 aligned with rear ends e (downstream ends relative to the compressed air flow) of the vanes (last stage vanes 13a or exit guide vanes 15). The compressor diffusers 5 are disposed with their side portions 51b of the one ends 51 corresponding to the rear ends e (downstream ends relative to the compressed air flow) of the vanes (last stage vanes 13a or exit guide vanes 15).

The compressor diffuser 5 is disposed with the side portions 51b of the one end 51 each corresponding to the rear end e of a vane (last stage vane 13a or exit guide vane 15) disposed at the outlet 16 of the compressor 1. This structure can reduce turbulence of the compressed air flowing from the side portions 51b to the other end 52, thereby reducing pressure loss in the compressed air.

The gas turbine 10 including the compressor diffusers 5 can reduce pressure loss in compressed air supplied from the compressor 1 to the combustion chambers 21. Such a reduction in pressure loss mainly leads to a smaller power for driving the compressor, which can in turn increase the overall efficiency of the gas turbine 10.

Sixth Embodiment

Figure 15:
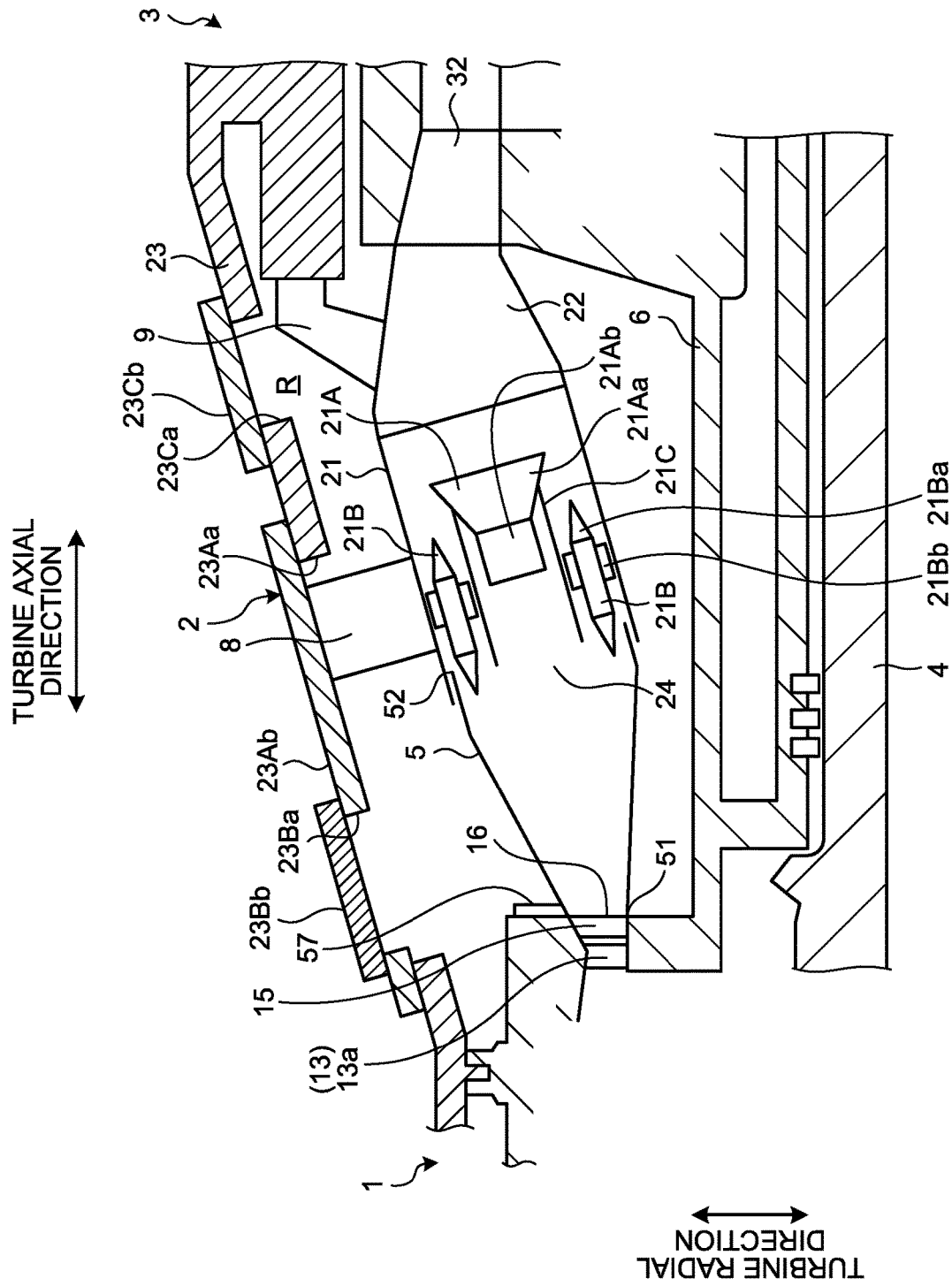
FIG. 15 is an enlarged sectional view of the combustor and its periphery in the gas turbine for illustrating a compressor diffuser according to a sixth embodiment of the present invention.
Figure 16:
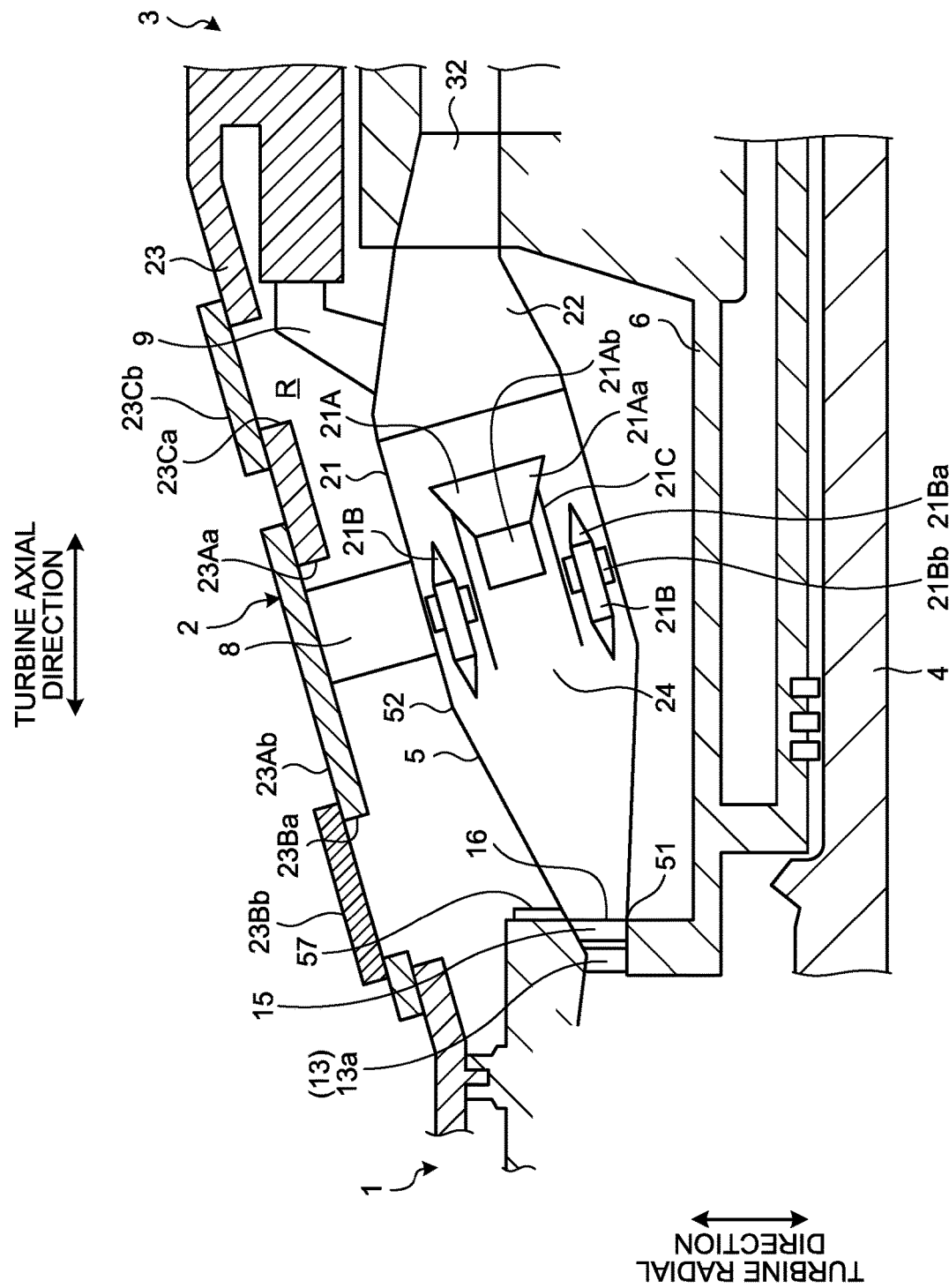
FIG. 16 is another enlarged sectional view of the combustor and its periphery in the gas turbine for illustrating the compressor diffuser according to the sixth embodiment of the present invention.
Figure 17:
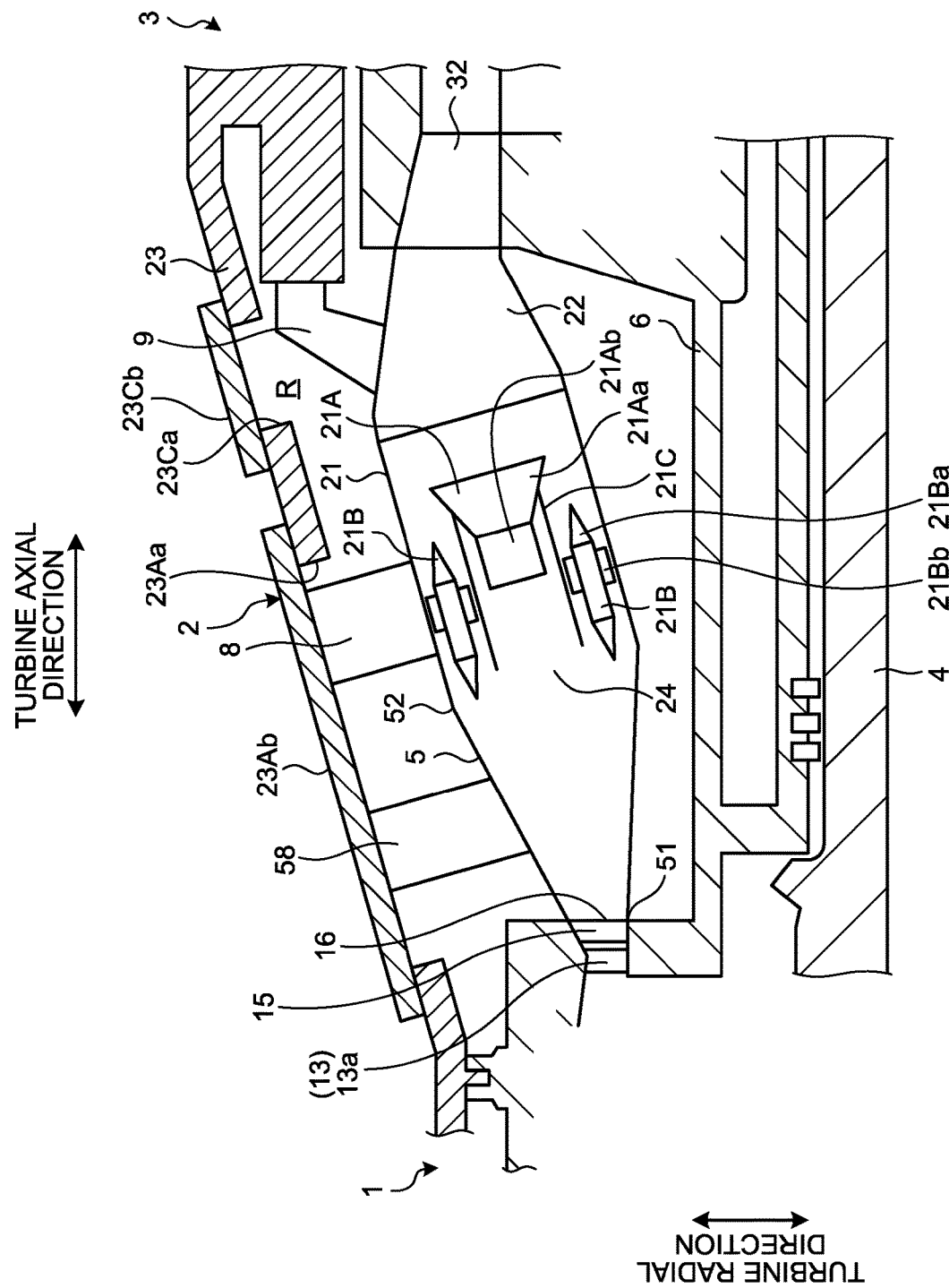
FIG. 17 is still another enlarged sectional view of the combustor and its periphery in the gas turbine for illustrating the compressor diffuser according to the sixth embodiment of the present invention.

FIGS. 15 to 17 are enlarged sectional views of the combustor and its periphery in the gas turbine for illustrating a compressor diffuser according to a sixth embodiment.

The compressor diffuser 5 according to the sixth embodiment is described with regard to installation, and other configurations are identical to those of the first to fifth embodiments above. In the sixth embodiment, like parts similar to those described in the first to fifth embodiments are similarly numbered and the explanations thereof are omitted.

The compressor diffuser 5 illustrated in FIG. 15 includes a mounting flange 57 at the one end 51. The mounting flange 57 projects outward from the one end 51 of the compressor diffuser 5 and is secured by bolts or other fastening members to a structure (e.g., a shroud for securing the last stage vanes 13a or the exit guide vanes 15) at the outlet 16 of the compressor 1. The compressor diffuser 5 illustrated in FIG. 15 is disposed with the other end 52 inserted in the air inlet 24 of the combustion chamber 21. The compressor diffuser 5 illustrated in FIG. 15 is secured such that the other end 52 is inserted in the combustion chamber 21 and the one end 51 is mounted to the outlet 16 of the compressor 1 via the mounting flange 57. To remove the compressor diffuser 5 illustrated in FIG. 15, the mounting flange 57 is disengaged from the outlet 16 of the compressor 1 and the other end 52 is pulled out from the combustion chamber 21.

The combustion chamber 21 is secured in the combustor casing chamber R by being supported by a supporting member 8 to the combustor casing 23. The transition piece 22 is secured in the combustor casing chamber R by being supported by a supporting member 9 to the combustor casing 23.

The combustor casing 23 has an opening 23Aa through which the combustion chamber 21 can be released. The opening 23Aa can be opened and closed with a combustion chamber cover 23Ab. The supporting member 8 is attached to the combustion chamber cover 23Ab. Upon removal of the combustion chamber cover 23Ab from the combustor casing 23, the combustion chamber 21 can be taken out from or put in to the combustor casing chamber R through the opening 23Aa.

The combustion chamber cover 23Ab has a manhole 23Ba through which the compressor diffuser 5 in the combustor casing chamber R can be accessed. The manhole 23Ba can be opened and closed with a cover 23Bb. Removing the cover 23Bb allows workers to enter the combustor casing chamber R via the manhole 23Ba and the workers can perform mounting or disengaging operation of the mounting flange 57. Upon removal of the combustion chamber cover 23Ab from the combustor casing 23, the compressor diffuser 5 can be taken out from or put into the combustor casing chamber R through the opening 23Aa.

The combustor casing 23 has a manhole 23Ca through which the transition piece 22 in the combustor casing chamber R can be accessed. The manhole 23Ca can be opened and closed with a cover 23Cb. Removing the cover 23Cb allows workers to enter the combustor casing chamber R via the manhole 23Ca and the workers can perform mounting or disengaging operation of the supporting member 9. Upon removal of the combustion chamber cover 23Ab from the combustor casing 23, the transition piece 22 can be taken out from or put into the combustor casing chamber R through the opening 23Aa.

As described above, the compressor diffuser 5 illustrated in FIG. 15 can be secured by inserting the other end 52 in the combustion chamber 21 and by mounting the mounting flange 57 to the outlet 16 of the compressor 1.

The compressor diffuser 5 illustrated in FIG. 16 includes the mounting flange 57 at the one end 51. The mounting flange 57 projects outward from the one end 51 of the compressor diffuser 5 and is secured by bolts or other fastening members to a structure (e.g., a shroud for securing the last stage vanes 13a or the exit guide vanes 15) at the outlet 16 of the compressor 1. The compressor diffuser 5 illustrated in FIG. 16 has the other end 52 integrally formed with the combustion chamber 21. The compressor diffuser 5 illustrated in FIG. 16 is secured by mounting the one end 51 to the outlet 16 of the compressor 1 via the mounting flange 57. The other end 52 of the compressor diffuser 5 illustrated in FIG. 16 is secured together with the combustion chamber 21.

The combustion chamber 21 is secured in the combustor casing chamber R by being supported by the supporting member 8 to the combustor casing 23. The transition piece 22 is secured in the combustor casing chamber R by being supported by the supporting member 9 to the combustor casing 23.

The combustor casing 23 has the opening 23Aa through which the combustion chamber 21 can be released. The opening 23Aa can be opened and closed with the combustion chamber cover 23Ab. The supporting member 8 is attached to the combustion chamber cover 23Ab. Upon removal of the combustion chamber cover 23Ab from the combustor casing 23, the combustion chamber 21 and the compressor diffuser 5 can be taken out from or put into the combustor casing chamber R through the opening 23Aa.

The combustion chamber cover 23Ab has the manhole 23Ba through which the compressor diffuser 5 in the combustor casing chamber R can be accessed. The manhole 23Ba can be opened and closed with the cover 23Bb. Removing the cover 23Bb allows workers to enter the combustor casing chamber R via the manhole 23Ba and the workers can perform mounting or disengaging operation of the mounting flange 57.

The combustor casing 23 has the manhole 23Ca through which the transition piece 22 in the combustor casing chamber R can be accessed. The manhole 23Ca can be opened and closed with the cover 23Cb. Removing the cover 23Cb allows workers to enter the combustor casing chamber R via the manhole 23Ca and the workers can perform mounting or disengaging operation of the supporting member 9. Upon removal of the combustion chamber cover 23Ab from the combustor casing 23, the transition piece 22 can be taken out from or put in to the combustor casing chamber R through the opening 23Aa.

As described above, since the compressor diffuser 5 illustrated in FIG. 16 has the other end 52 integrally formed with the combustion chamber 21, the compressor diffuser 5 can be secured together with the combustion chamber 21 by mounting the mounting flange 57 to the outlet 16 of the compressor 1.

The compressor diffuser 5 illustrated in FIG. 17 is disposed with the other end 52 inserted in the air inlet 24 of the combustion chamber 21 (see FIG. 15). The compressor diffuser 5 illustrated in FIG. 17 may have the other end 52 integrally formed with the combustion chamber 21. The compressor diffuser 5 illustrated in FIG. 17 is supported by a supporting member 58 to the combustor casing 23. The compressor diffuser 5 illustrated in FIG. 17 is secured in the combustor casing chamber R via the supporting member 58 with the one end 51 abutting the outlet 16 of the compressor 1.

The combustion chamber 21 is secured in the combustor casing chamber R by being supported by the supporting member 8 to the combustor casing 23. The transition piece 22 is secured in the combustor casing chamber R by being supported by the supporting member 9 to the combustor casing 23.

The combustor casing 23 has the opening 23Aa through which the combustion chamber 21 can be released. The opening 23Aa can be opened and closed with the combustion chamber cover 23Ab. The supporting member 8 is attached to the combustion chamber cover 23Ab. Upon removal of the combustion chamber cover 23Ab from the combustor casing 23, the combustion chamber 21 and the compressor diffuser 5 can be taken out from or put into the combustor casing chamber R through the opening 23Aa.

The combustor casing 23 has the manhole 23Ca through which the transition piece 22 in the combustor casing chamber R can be accessed. The manhole 23Ca can be opened and closed with the cover 23Cb. Removing the cover 23Cb allows workers to enter the combustor casing chamber R via the manhole 23Ca and the workers can perform mounting or disengaging operation of the supporting member 9. Upon removal of the combustion chamber cover 23Ab from the combustor casing 23, the transition piece 22 can be taken out from or put into the combustor casing chamber R through the opening 23Aa.

The compressor diffuser 5 illustrated in FIG. 17 can be secured in the combustor casing chamber R via the supporting member 58 with the other end 52 inserted in the combustion chamber 21 and the one end 51 abutting the outlet 16 of the compressor 1. If the other end 52 is integrally formed with the combustion chamber 21, the compressor diffuser 5 illustrated in FIG. 17 can be secured in the combustor casing chamber R via the supporting member 58 with the one end 51 abutting the outlet 16 of the compressor 1.

REFERENCE SIGNS LIST

1 Compressor
11 Air intake
12 Compressor casing
13 Compressor vane
13a Last stage vane
14 Compressor blade
15 Exit guide vane
16 Outlet
2 Combustor
21 Combustion chamber
21A Pilot combustion burner
21Aa Pilot cone
21Ab Pilot nozzle
21B Main combustion burner
21Ba Main nozzle
21Bb Swirler vane
21C Inner cylinder
22 Transition piece
23 Combustor casing
23Aa Opening
23Ab Combustion chamber cover
23Ba Manhole
23Bb Cover
23Ca Manhole
23Cb Cover
24 Air inlet
3 Turbine
31 Turbine casing
32 Turbine vane
33 Turbine blade
34 Exhaust
34a Exhaust diffuser
4 Turbine shaft (rotational shaft)
41, 42 Bearing
5 Compressor diffuser
51 One end
51a Double arc portion
51b Side portion
52 Other end
53 Inner member
53b Rear end portion
53a Front end portion
54 Separating member
54a Front end portion
54b Rear end portion
54c Separating plate
55 Air bleed port
56 Side wall
57 Mounting flange
58 Supporting member
6 Intermediate shaft cover
7 Cooling device
71 Air discharge pipe
72 Air supply pipe
73 Cooling air pipe
74 Heat exchanger
8 Supporting member
9 Supporting member
10 Gas turbine
t Front end
e Rear end
D1, D2 Turbine circumferential direction dimension
H1, H2 Turbine radial direction dimension
P Compressed air
C Center axis
R Combustor casing chamber
W Range

The invention claimed is:

1. A gas turbine comprising:
a turbine arranged to drive a rotational shaft;
a plurality of cylindrical combustion chambers arranged around the rotational shaft to supply combustion gas to the turbine;
a compressor arranged to be rotated by the rotational shaft to generate compressed air; and
a plurality of compressor diffusers between the cylindrical combustion chambers and the compressor, each of the compressor diffusers comprising:
a first end connected to an outlet of the compressor and having an outline formed in a plane perpendicular to an axis of the gas turbine and defined by double arc portions and radially-oriented side walls;
a second end connected to an air inlet of a respective one of the cylindrical combustion chambers, the second end defining an opening shaped to conform to a cylindrical shape of the respective one of the cylindrical combustion chambers; and
an inner member configured such that the second end has a double-annular outline, the inner member having a front end portion facing toward the first end and a rear end portion at the second end to form the double-annular outline, the double-annular outline defining a ring-shaped opening between the inner member and a wall of the respective compressor diffuser, the front end portion having a curvilinear arc shape curving about the rotational shaft and centered, in a turbine radial direction, in the respective compressor diffuser, the inner member having a shape increasing in cross-sectional area in a direction from the first end of the respective compressor diffuser to the second end of the respective compressor diffuser, wherein the compressor diffuser extends along an axial direction of the rotational shaft from the first end to the second end.

2. The gas turbine according to claim 1, further comprising an air bleed port disposed at at least one of the first end and the second end to bleed the compressed air.

3. The gas turbine according to claim 1, wherein the compressor diffuser accommodates a vane inside the first end, the vane being disposed at the outlet of the compressor to divide a flow path in a turbine circumferential direction, the radially-oriented side walls being shaped to conform to a shape of the vane.

4. The gas turbine according to claim 1, each of the radially-oriented side walls being shaped to correspond to a rear end of a vane disposed at the outlet of the compressor.

5. The gas turbine according to claim 1, wherein the second end is inserted in the cylindrical combustion chamber and the first end is mounted to the outlet of the compressor via a mounting flange.

6. The gas turbine according to claim 1, wherein the second end is integrally formed with the cylindrical combustion chamber, and the first end is mounted to the outlet of the compressor via a mounting flange.

7. The gas turbine according to claim 1, wherein each compressor diffuser is mounted via a supporting member in a combustor casing chamber in which the respective cylindrical combustion chamber is disposed with the second end being inserted in the respective cylindrical combustion chamber and the first end abutting the outlet of the compressor.

8. The gas turbine according to claim 1, wherein each compressor diffuser is mounted via a supporting member in a combustor casing chamber in which the respective cylindrical combustion chamber is disposed with the second end being integrally formed with the respective cylindrical combustion chamber and the first end abutting the outlet of the compressor.

9. The gas turbine according to claim 1, wherein the front end portion is beak-shaped.

10. A gas turbine comprising:
a turbine arranged to drive a rotational shaft;
a plurality of cylindrical combustion chambers arranged around the rotational shaft to supply combustion gas to the turbine;
a compressor arranged to be rotated by the rotational shaft to generate compressed air; and
a plurality of compressor diffusers between the cylindrical combustion chambers and the compressor, each of the compressor diffusers comprising:
a first end connected to an outlet of the compressor and having an outline formed in a plane perpendicular to the rotational shaft and defined by double arc portions and radially-oriented side walls;
a second end connected to an air inlet of a respective one of the cylindrical combustion chambers, the second end defining an opening shaped to conform to the cylindrical shape of the respective one of the cylindrical combustion chambers, the opening having a double-annular shape formed of two circular shapes; and
a separating member configured to divide a path within the compressor diffuser into two continuous paths extending from the first end to the second end, the separating member having a front end portion at the first end and a rear end portion at the second end, the front end portion and the rear end portion being radially centered, with respect to a turbine radial direction, between the double arc portions, the double-arc portions curving about the rotational shaft, wherein the separating member extends along an axial direction of the rotational shaft from the first end to the second end and along a turbine circumferential direction and centered, between the double arc portions, in a plane perpendicular to the rotational shaft.

11. The gas turbine according to claim 10, further comprising an air bleed port disposed at at least one of the first end and the second end to bleed the compressed air.

12. The gas turbine according to claim 10, wherein the compressor diffuser accommodates a vane inside the first end, the vane being disposed at the outlet of the compressor, to divide a flow path in the turbine circumferential direction, the radially-oriented side walls being shaped to conform to a shape of the vane.

13. The gas turbine according to claim 10, each of the radially-oriented side walls being shaped to correspond to a rear end of a vane disposed at the outlet of the compressor.

14. The gas turbine according to claim 10, wherein the second end is inserted in the cylindrical combustion chamber and the first end is mounted to the outlet of the compressor via a mounting flange.

15. The gas turbine according to claim 10, wherein the second end is integrally formed with the cylindrical combustion chamber, and the first end is mounted to the outlet of the compressor via a mounting flange.

16. The gas turbine according to claim 10, wherein each compressor diffuser is mounted via a supporting member in a combustor casing chamber in which the respective cylindrical combustion chamber is disposed with the second end being inserted in the respective cylindrical combustion chamber and the first end abutting the outlet of the compressor.

17. The gas turbine according to claim 10, wherein each compressor diffuser is mounted via a supporting member in a combustor casing chamber in which the respective cylindrical combustion chamber is disposed with the second end being integrally formed with the respective cylindrical combustion chamber and the first end abutting the outlet of the compressor.

* * * * *